(12) United States Patent
Frye et al.

(10) Patent No.: US 10,436,331 B2
(45) Date of Patent: Oct. 8, 2019

(54) GATE VALVE

(71) Applicants: Parker-Hannifin Corporation, Cleveland, OH (US); Weir Slurry Group, Inc., Madison, WI (US)

(72) Inventors: Matthew Richard Frye, Warsaw, IN (US); Richard J. Fecho, Berrien Springs, MI (US)

(73) Assignees: Parker-Hannifin Corporation, Cleveland, OH (US); Weir Slurry Group, Inc., Madison, WI (US)

( * ) Notice: Subject to any disclaimer, the term of this patent is extended or adjusted under 35 U.S.C. 154(b) by 36 days.

(21) Appl. No.: 15/511,945

(22) PCT Filed: Sep. 15, 2015

(86) PCT No.: PCT/US2015/050140
§ 371 (c)(1),
(2) Date: Mar. 16, 2017

(87) PCT Pub. No.: WO2016/044241
PCT Pub. Date: Mar. 24, 2016

(65) Prior Publication Data
US 2017/0292617 A1 Oct. 12, 2017

Related U.S. Application Data

(60) Provisional application No. 62/051,102, filed on Sep. 16, 2014.

(51) Int. Cl.
*F16K 3/14* (2006.01)
*F16K 3/20* (2006.01)
(Continued)

(52) U.S. Cl.
CPC .............. *F16K 3/14* (2013.01); *F16J 15/028* (2013.01); *F16K 3/0227* (2013.01);
(Continued)

(58) Field of Classification Search
CPC ........ F16K 3/02; F16K 3/0227; F16K 3/0245; F16K 3/0281; F16K 3/10; F16K 3/14;
(Continued)

(56) References Cited

U.S. PATENT DOCUMENTS 2,774,371 A * 12/1956 Grannenfelt .......... F16K 3/0281
137/242
3,356,334 A  12/1967 Scaramucci
(Continued)

FOREIGN PATENT DOCUMENTS

DE    10 08 070 B    5/1957
EP    2469135 A1 *  6/2012  ........... F16K 3/0227

OTHER PUBLICATIONS

International Search Report and Written Opinion for corresponding International Patent Application No. PCT/US2015/050140 dated Jan. 21, 2016.
(Continued)

*Primary Examiner* — Reinaldo Sanchez-Medina
*Assistant Examiner* — Hailey K. Do
(74) *Attorney, Agent, or Firm* — Renner, Otto, Boisselle & Sklar, LLP

(57) ABSTRACT

A seal with a wedging element for adjustably compressing the seal. The seal abuts a surface, such as a gate of a gate valve, to seal against the surface with a sealing force that prevents fluid flow therebetween. The sealing force of the seal may be increasing or decreasing compression by adjusting the wedging mechanism. For example, as the seal wears away due to friction between the seal and a sliding gate, the compression may be increased in the wedging mechanism to increase the sealing force to a low threshold.

20 Claims, 14 Drawing Sheets

(51) Int. Cl.
*F16K 3/02* (2006.01)
*F16K 3/16* (2006.01)
*F16J 15/02* (2006.01)

(52) U.S. Cl.
CPC ............ *F16K 3/0281* (2013.01); *F16K 3/205* (2013.01); *F16K 3/0245* (2013.01); *F16K 3/16* (2013.01)

(58) Field of Classification Search
CPC ... F16K 3/16; F16K 3/20; F16K 3/205; F16K 27/04; F16K 27/044; Y10T 137/0514; Y10T 137/6072; Y10T 137/6075; Y10T 137/6079; Y10T 137/6082; B65D 90/58; B65D 90/587; B65D 90/54; B65D 2590/54; B65D 2590/542
See application file for complete search history.

(56) References Cited

U.S. PATENT DOCUMENTS

| | | | |
|---|---|---|---|
| 3,809,362 A | 5/1974 | Baumann | |
| 4,067,584 A * | 1/1978 | Hunger | F16J 1/02 277/451 |
| 4,111,394 A * | 9/1978 | Jaudt | F16K 3/202 251/214 |
| 4,138,126 A * | 2/1979 | Jaudt | F16K 27/044 251/159 |
| 4,394,022 A * | 7/1983 | Gilmore | F16J 15/02 277/377 |
| 5,205,535 A | 4/1993 | Nevrekar | |
| 5,292,105 A * | 3/1994 | Velimirovic | F16K 3/0281 251/214 |
| 5,413,140 A | 5/1995 | Kimpel et al. | |
| 8,327,870 B2 * | 12/2012 | Sidler | F16K 3/0227 137/242 |
| 8,403,298 B2 | 3/2013 | Nguyen | |
| 9,809,382 B2 * | 11/2017 | Marchesini | B65D 90/587 |
| 2004/0084851 A1 | 5/2004 | Lugovskoy et al. | |
| 2009/0184279 A1 | 7/2009 | Hulse et al. | |
| 2010/0224816 A1 | 9/2010 | Ohlson et al. | |

OTHER PUBLICATIONS

Second Written Opinion of the International Preliminary Examining Authority for corresponding International Patent Application No. PCT/US2015/050140 dated Aug. 18, 2016.

International Preliminary Report on Patentability for corresponding International Patent Application No. PCT/US2015/050140 dated Feb. 24, 2017.

Gyungho Khim et al., A Three-Axis Translation Stage Using Opposing Wedges with Error Compensation, Mar. 2012, International Journal of Precision Engineering and Manufactudng, vol. 13, Issue 3, pp. 401-406.

* cited by examiner

GATE VALVE

This application is a national phase of International Application No. PCT/US2015/050140 filed Sep. 15, 2015 and published in the English language.

RELATED APPLICATIONS

This application claims the benefit of U.S. Provisional Application No. 62/051,102 filed Sep. 16, 2014, which is incorporated herein by reference.

FIELD OF INVENTION

The present invention relates generally to gate valves, and more particularly to gate valve seals.

BACKGROUND

A gate valve is a valve that opens by lifting a round or rectangular gate out of the path of the fluid. The gate valve has sealing surfaces between the gate and seats that are planar, leading to gate valves being used when a straight-line flow of fluid and minimum restriction is desired. Generally, gate valves are used to permit or prevent the flow of liquids, for example in a pipe line system.

Liquid is able to flow when the gate of the gate valve is linearly retracted to open the flow path, whereas the liquid is prevented from flowing when the gate is linearly extended to a closed position. In the closed position liquid impinges a front side face of the gate and is prevented from passing between the gate and a body of the gate valve by rubber valve liners that surround the gate. Typically, the rubber valve liners are fixed in the body of the gate valve and rub against the gate as the gate opens and closes causing the rubber valve liners to wear away and lose their sealing ability. Furthermore, increasing compression of the rubber valve liners against the gate increases the wear rate of the rubber valve liners. Some gate valves employ spring components to maintain compression of the rubber valve liners, but compression force decreases as the rubber valve liners wear.

SUMMARY OF INVENTION

The present invention provides a gate valve including a seal with a wedging element for adjustably compressing the seal. The seal abuts a surface, such as a gate of the gate valve, to seal against the surface with a sealing force that prevents fluid flow therebetween. The compression sealing force of the seal may be increased or decreased by adjusting the wedging mechanism. For example, as the seal wears away due to friction between the seal and a sliding gate the compression sealing force diminishes and may diminish below a desired low threshold. The compression sealing force may be increased by movement of the wedging mechanism to increase the sealing force to at least the low threshold.

Also, the sealing force may be decreased below a high threshold to avoid wear on the seal. Adjusting the sealing force allows the seal to seal more effectively and allows increasing the usable lifespan of the seal. In particular, gate valves open and close using a gate that slides against a seal, which causes wearing of the seal. The wedge mechanism allows easily increasing the sealing force of the seal against the gate to counteract the loss of sealing force due to wear.

According to one aspect of the invention, is a gate valve assembly comprising a valve body having an inlet and an outlet, a gate disposed within the valve body and slidably connected to the valve body such that the gate slides along a normal axis between an open position to a closed position, wherein in the closed position the inlet is fluidly disconnected from the outlet, a seal having a longitudinal axis perpendicular to the normal axis and extending along the gate such that the gate slides against a first seal surface of the seal when the gate slides between the open position and the closed position, and a wedging element abutting a second seal surface of the seal opposite the first seal surface, wherein the wedging element comprises a front side for engaging the second seal surface and a backside for engaging an opposite wedge surface such that movement of the wedging element along the longitudinal axis causes the wedging element to exert a force against the seal along a lateral axis perpendicular to the longitudinal axis.

According to another aspect of the invention, is a seal assembly comprising a seal having a longitudinal axis and a lateral axis perpendicular to the longitudinal axis, wherein the seal has a first seal surface extending along the longitudinal axis, and a wedging element abutting a second seal surface of the seal opposite the first seal surface, wherein the wedging element comprises a front side for engaging the second seal surface and a backside for engaging an opposite wedge surface such that movement of the wedging element along the longitudinal axis causes the wedging element to exert a force against the seal along a lateral axis perpendicular to the longitudinal axis.

The foregoing and other features of the invention are hereinafter described in greater detail with reference to the accompanying drawings.

DETAILED DESCRIPTION

Figure 1:
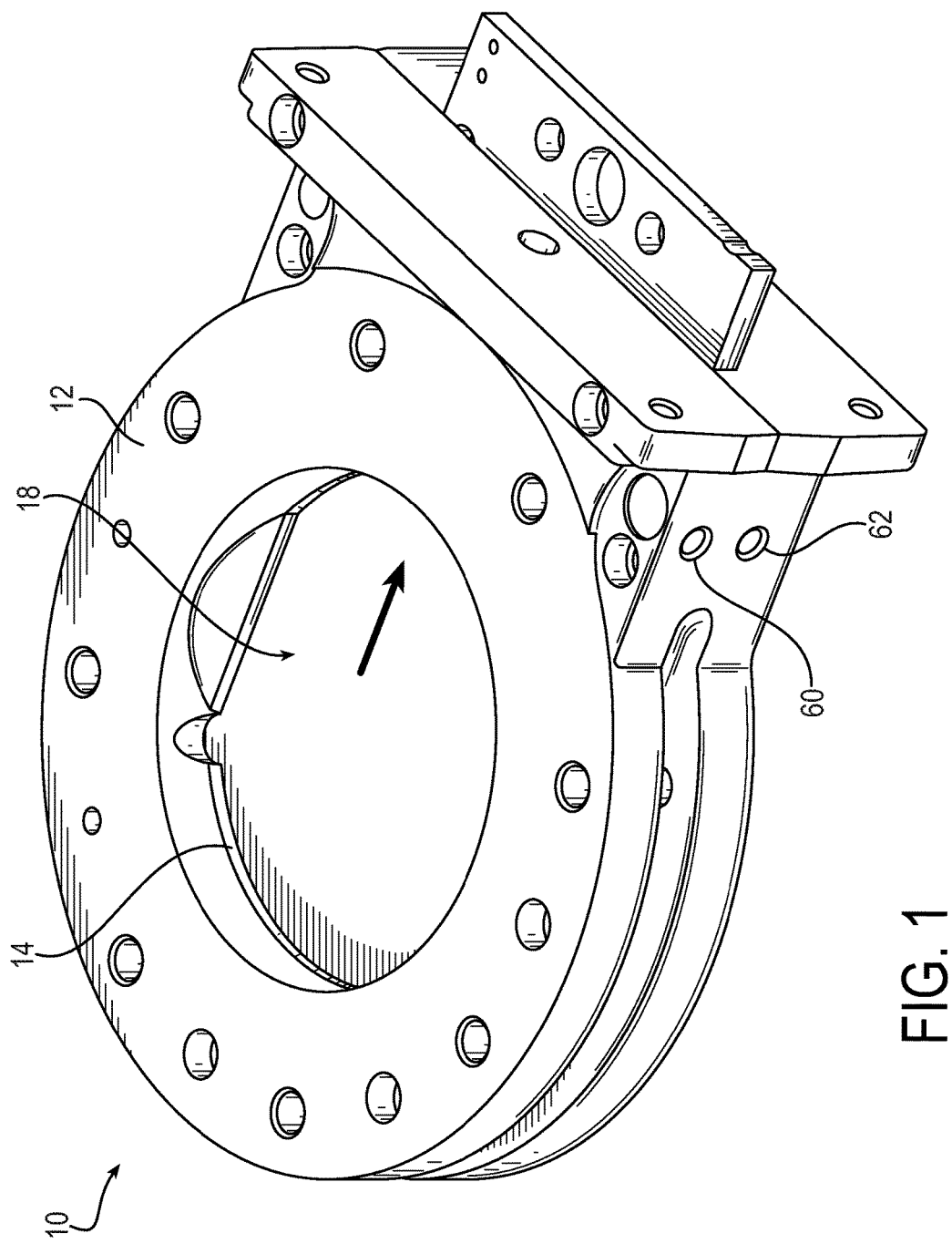
FIG. 1 is a drawing depicting a perspective view of an exemplary gate valve.

Embodiments of the present invention will now be described with reference to the drawings, wherein like reference numerals are used to refer to like elements throughout. It will be understood that the figures are not necessarily to scale.

The principles of this present application have particular application to gate valves for restricting, preventing, and allowing fluid flow in a fluid passage, such as oil flow in an oil pipeline, and thus will be described below chiefly in this context. It will be appreciated that principles of this invention may be applicable to other valves where it is desirable to restrict, prevent, or allow fluid flow using a seal.

Figure 2:
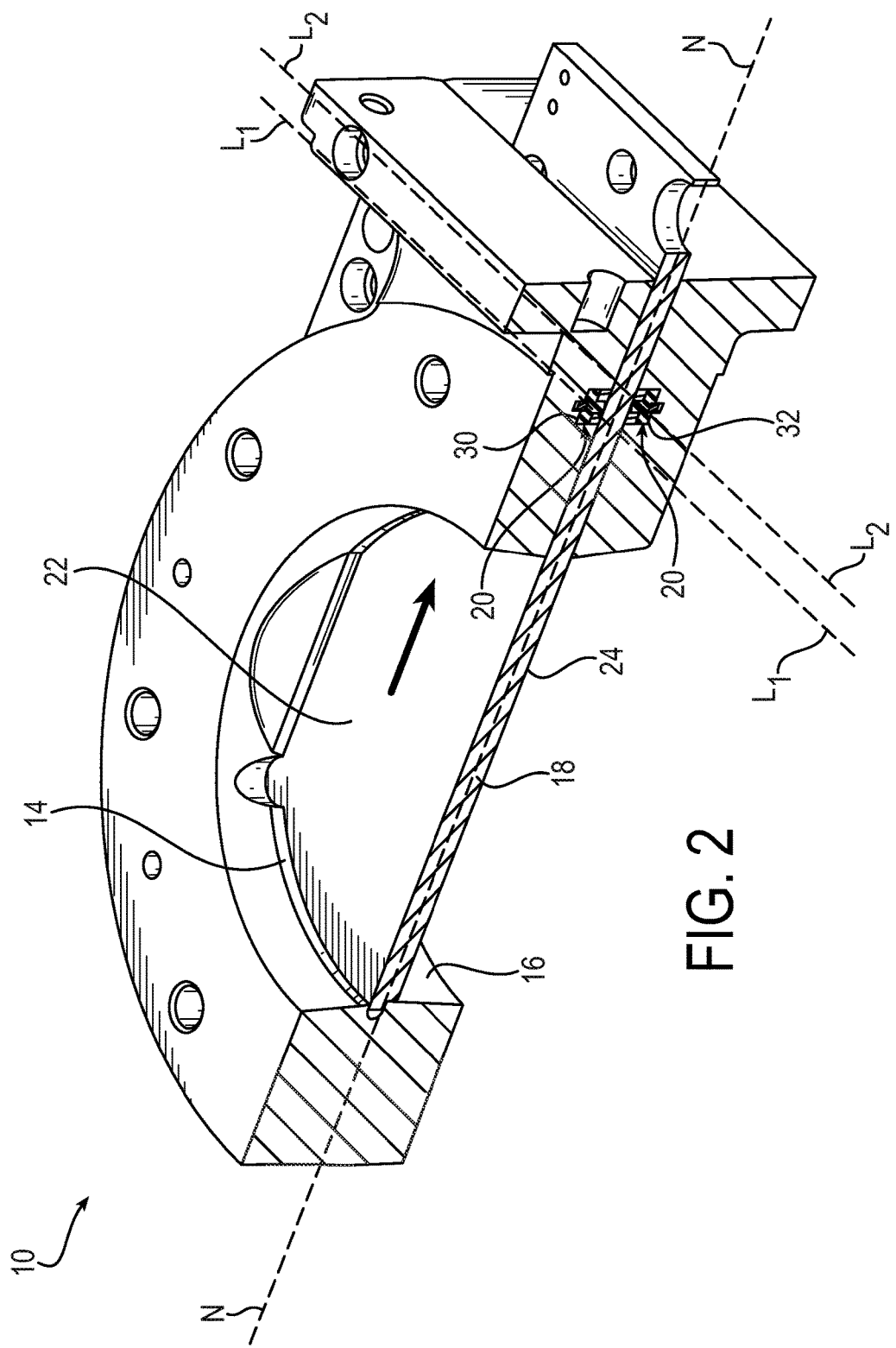
FIG. 2 is a drawing depicting a cross-section view of the gate valve assembly of FIG. 1.
Figure 3:
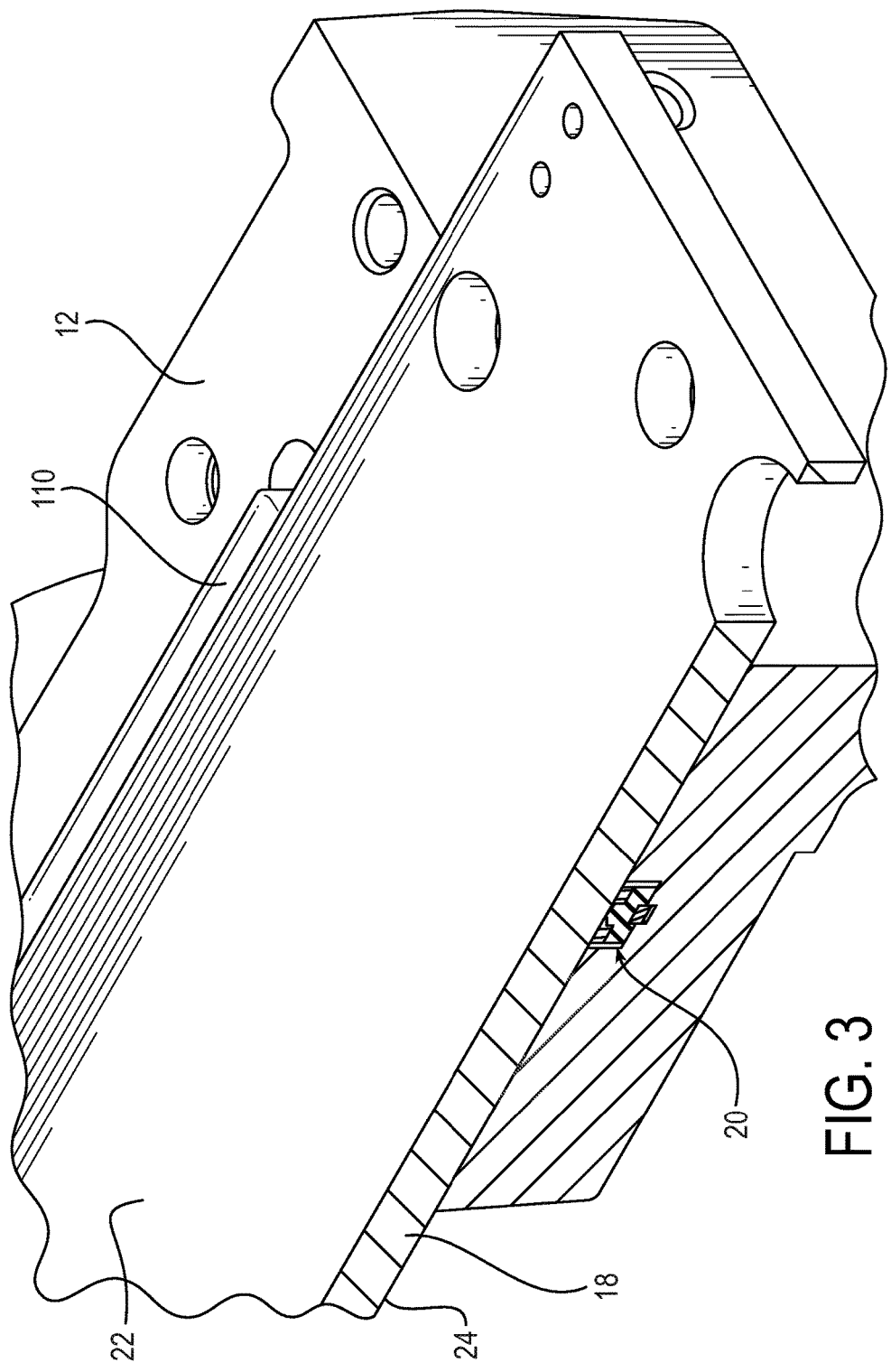
FIG. 3 is a drawing depicting a cross-section view of the gate valve assembly of FIG. 1 with a top portion removed.

Referring initially to FIGS. 1-3, a gate valve assembly 10 is illustrated. The gate valve assembly 10 includes a valve body 12 having an inlet 14 an outlet 16 (shown in FIG. 2), a gate 18, and a seal assembly 20. The gate 18 is disposed within and slidable within the valve body 12 to open or close the gate valve assembly 10. The gate 18 is shown in the closed position. When the gate 18 is in the closed position, fluid flows to the inlet 14 and impinges an inlet facing surface 22 of the gate 18. The gate 18 prevents the fluid from flowing to the outlet 16.

The gate 18 is slidable along a normal axis N into an open position. When the gate 18 is in the open position, fluid is able to pass by an outlet facing surface 24 of the gate 18 and flow through the inlet 14 to the outlet 16 along a direction perpendicular to the normal axis N.

Figure 4:
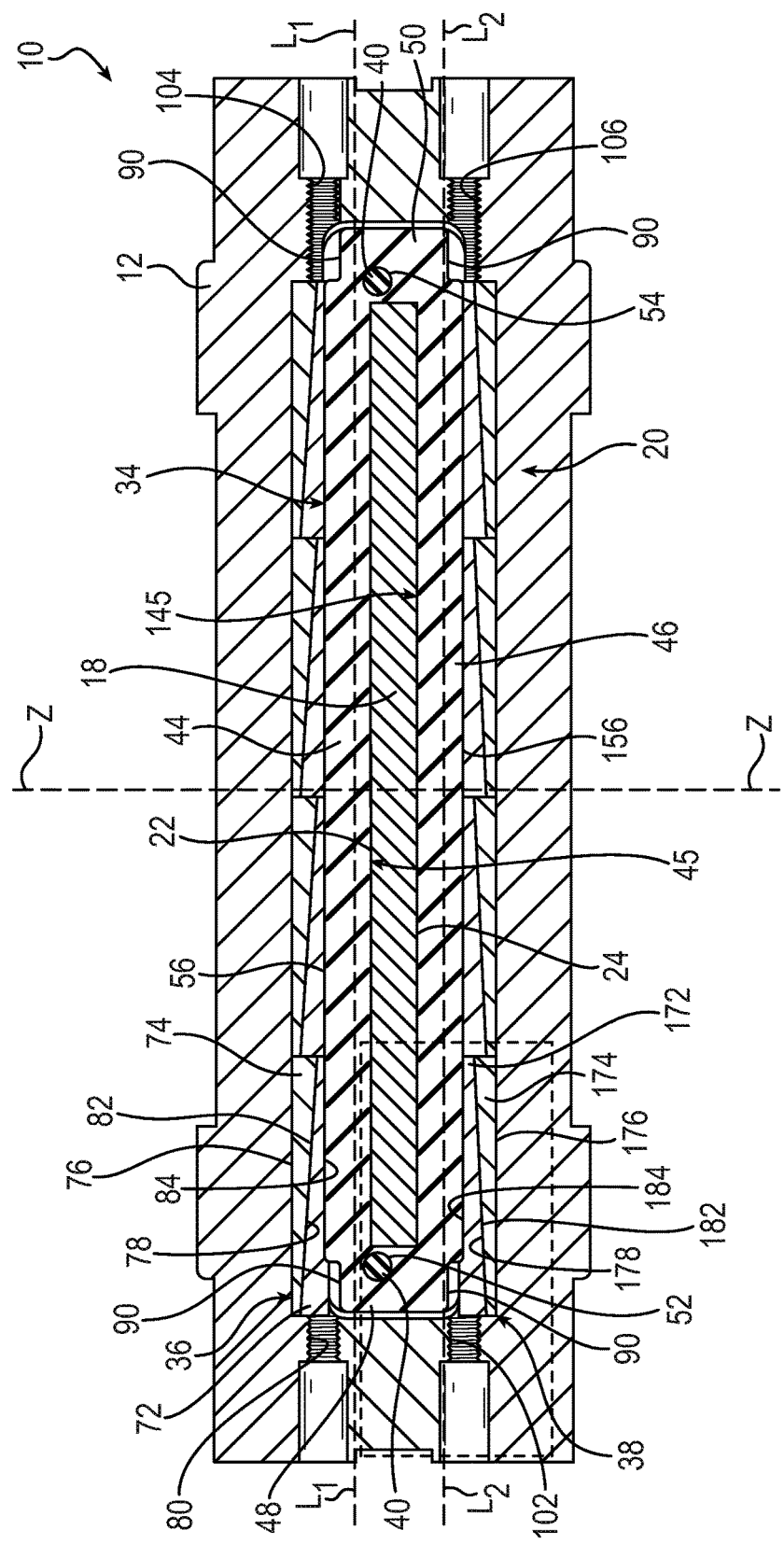
FIG. 4 is a drawing depicting a cross-section of the gate valve assembly of FIG. 1.

Referring to FIGS. 2 and 4, the valve body 12 includes an inlet channel 30 extending along a longitudinal axis $L_1$ that is perpendicular to the normal axis N and parallel with the inlet facing surface 22. The inlet channel 30 has an open end facing the inlet facing surface 22 of the gate 18 for allowing the seal assembly 20 to seal against the inlet facing surface 22. The inlet channel 30 may include a cam channel (similar to a cam channel 33 referred to below) centrally disposed and extending longitudinally along the extent of the inlet channel 30 opposite the gate 18.

The valve body 12 also includes an outlet channel 32 extending along a longitudinal axis $L_2$ that is perpendicular to the normal axis N and parallel with the outlet facing surface 24. The outlet channel 32 has an open end facing the outlet facing surface 24 of the gate 18 for allowing the seal assembly 20 to seal against the inlet facing surface 22. The outlet channel 32 may include a cam channel 33 centrally disposed and extending longitudinally along the extent of the inlet channel 32 opposite the gate 18.

The gate 18 is disposed within the valve body 12 and slidably connected to the valve body 12 such that the gate 18 slides along the normal axis N between an open position to a closed position. In the closed position the inlet 14 is fluidly disconnected from the outlet 16. Fluidly disconnecting the inlet 14 from the outlet 16 prevents fluid from passing through the gate valve assembly 10.

The seal assembly 20 may include a seal 34 that extends along one or both longitudinal axes $L_1$, $L_2$. The longitudinal axes $L_1$, $L_2$ are perpendicular to the normal axis N and extend along the gate 18 such that the gate 18 slides against the seal 34 when the gate slides between the open position and the closed position.

Cam assemblies 36, 38, also referred to as wedging elements, may abut the seal 34 opposite the gate 18. The cam assemblies 36, 38 are able to exert a compressive force on the seal 34 to increase sealing force of the seal 34 against the gate 18. The cam assemblies 36, 38 may also decrease the sealing force of the seal 34 against the gate 18.

Each cam assembly 36, 38 may include a first cam 72, 172 and/or a second cam 74, 174, also referred to as wedging elements. Each first cam 72, 172 is engageable with the seal 34 and the second cam 74, 174 such that movement of the first cam 72, 172 along the corresponding longitudinal axis $L_1$, $L_2$ causes the first cam 72, 172 to exert a force against the seal 34 along a lateral axis Z perpendicular to the longitudinal axes $L_1$, $L_2$.

The seal assembly 20 may include the first cam 72, 172 and/or the second cam 74, 174, as well as the seal 34, which extends along the longitudinal axis $L_1$ and/or longitudinal axis $L_2$. The seal assembly 20 may be placed into the valve body 12 prior to assembly of the gate valve 10.

Referring now to FIGS. 5-9, the seal assembly 20 may include the seal 34 for abutting the gate 18, the first cam assembly 36 for wedging the seal 34 against inlet facing surface 22 of the gate 18, the second cam assembly 38 for wedging the seal 34 against the outlet facing surface 24 of the gate 18, and a U-shaped o-ring 40 for sealing the sides of the gate 18.

The seal 34 is illustrated as one-piece and having an inlet seal portion 44, an outlet seal portion 46, two side seal portions 48, 50, and a o-ring channels 52, 54. Alternatively, the inlet seal portion, outlet seal portion, and two side portions may be separate components.

The inlet seal portion 44 has a gate facing surface 45 and a cam facing surface 56 opposite the gate facing surface 45. The gate facing surface 45 extends along the longitudinal axis $L_1$ and abuts the inlet facing surface 22 of the gate 18. The cam facing surface 56 extends along the longitudinal axis $L_1$ and abuts the cam assembly 36.

When the gate 18 opens, the inlet facing surface 22 exerts a friction force upon the gate facing surface 45 such that the gate facing surface 45 may wear away during use.

Figure 5:
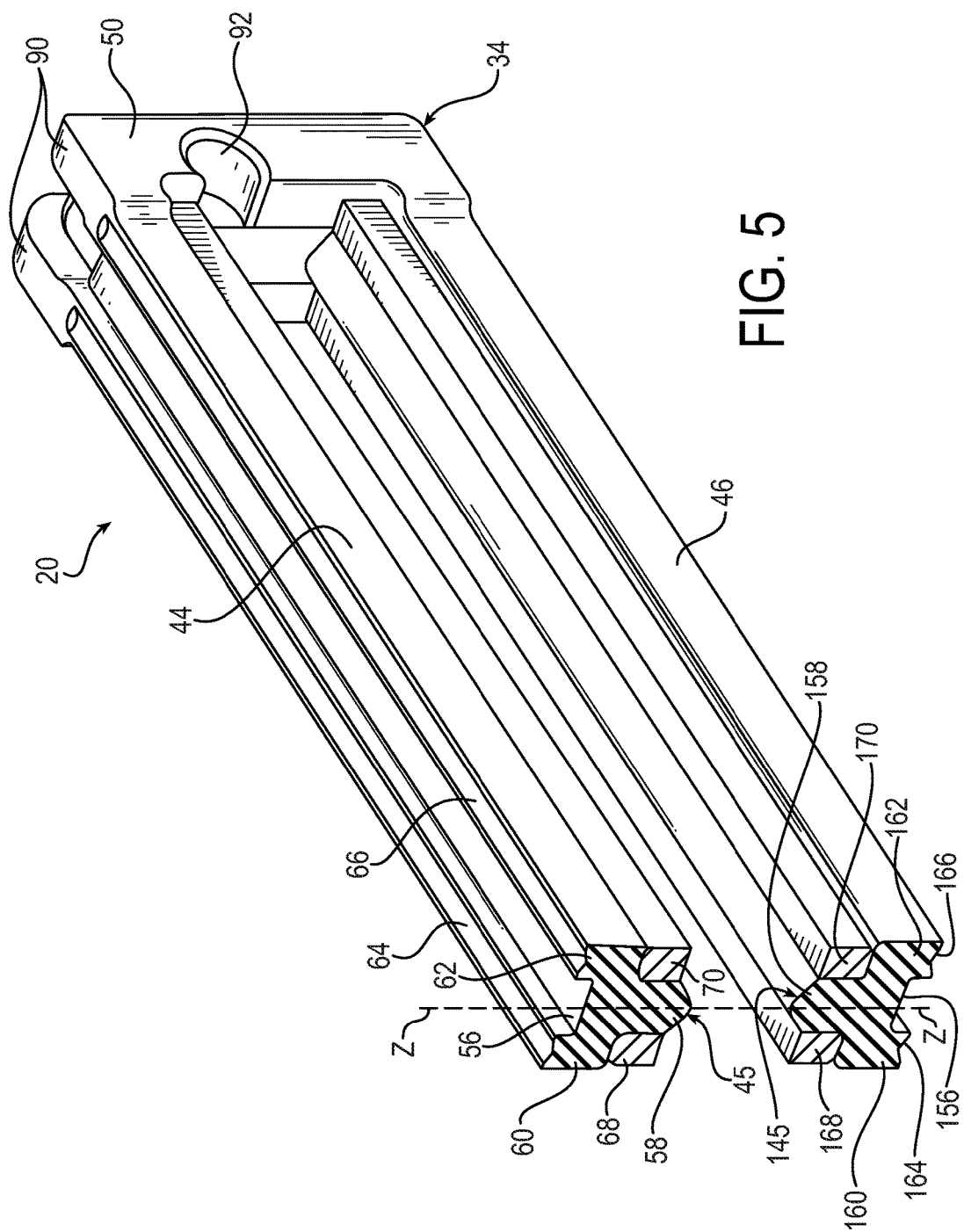
FIG. 5 is a drawing depicting a cross-section view of a portion of a seal assembly of the gate valve assembly of FIG. 1.
Figure 6:
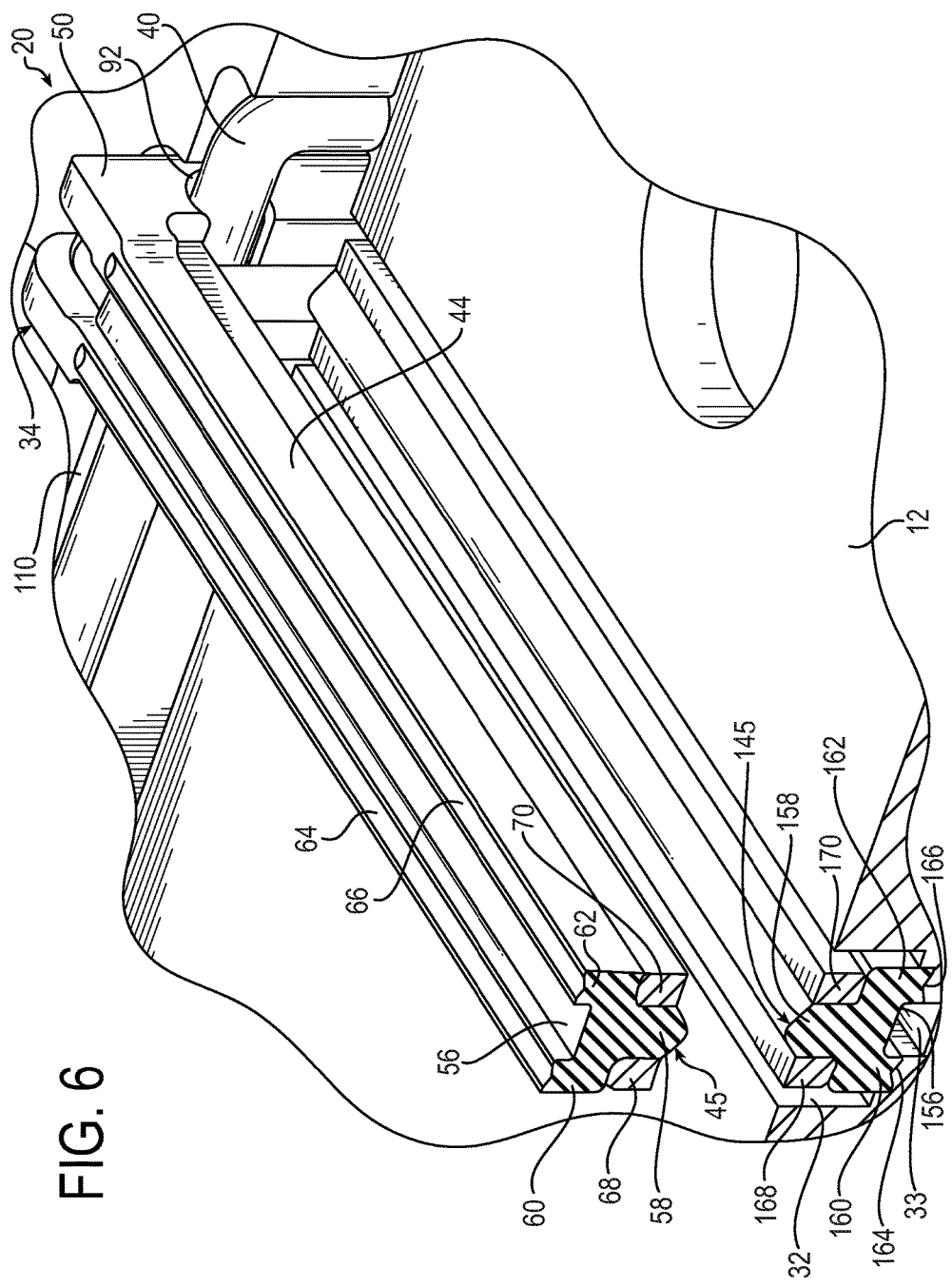
FIG. 6 is a drawing depicting a cross-section view of the gate valve assembly of FIG. 1 with a portion of a body of the gate valve assembly removed.
Figure 7:
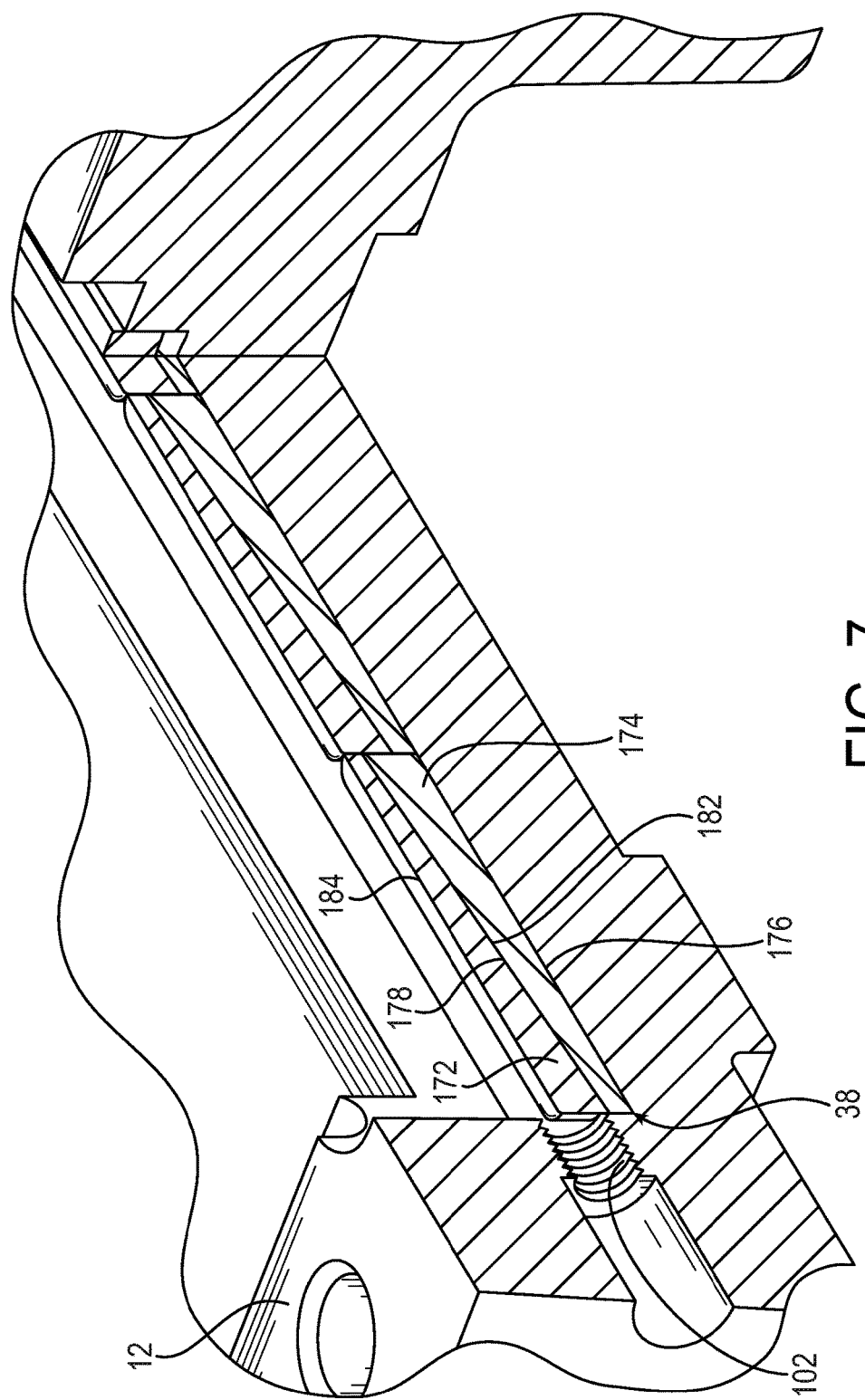
FIG. 7 is a drawing depicting a cross-section of a bottom portion of the gate valve assembly of FIG. 1.

Referring to FIGS. 5 and 6, the inlet seal portion 44 may include a cam facing surface 56 extending longitudinally across and opposite a protruding portion 58 of the gate facing surface 45 that faces the inlet facing surface 22. The cam facing surface 56 may be disposed between leg portions 60, 62 that extend longitudinally and away from the cam facing surface 56 along a lateral axis Z that is perpendicular to the normal axis N and at least one of the lateral axes $L_1$, $L_2$. The leg portions 60, 62 engage a surface of the channel 30 of the valve body 12 to seal against fluid passing between the seal 34 and the valve body 12.

The leg portions 60, 62 may have a concave portion 64, 66 at an end opposite the protruding portion 58. The concave portions 64, 66 extend longitudinally along the leg portions 60, 62 and allow the seal 34 to seal against the surface of the channel 30 with less compressive force along the lateral axis Z. Also, the concave portions 64, 66 allow a reduction of drag caused by the gate 18 sliding against the seal 34. Thus, the seal 34 may be a low drag seal.

The protruding portion 58 may have a convex shape extending longitudinally for sealing against the inlet facing surface 22. The convex shape may be centrally disposed along the normal axis N for spreading force equally to the leg portions 60, 62.

Similarly to the inlet seal portion 44, when the gate 18 opens the outlet facing surface 24 exerts a friction force upon a gate facing surface 145 such that the gate facing surface 145 may wear away during use.

The outlet seal portion 46 may include a cam facing surface 156 extending longitudinally across and opposite a protruding portion 158 of the gate facing surface 145 that faces the outlet facing surface 24. The cam facing surface 156 may be disposed between leg portions 160, 162 that extend longitudinally and away from the cam facing surface 156 along the lateral axis Z. The leg portions 160, 162 engage a surface of the channel 32 of the valve body 12 to seal against fluid passing between the seal 34 and the valve body 12.

The leg portions 160, 162 may have a concave portion 164, 166 at an end opposite the protruding portion 158. The concave portions 164, 166 extend longitudinally along the leg portions 160, 162 and allow the seal 34 to seal against the surface of the channel 32 with less compressive force along the lateral axis Z. Also, the concave portions 164, 166 allow a reduction of drag caused by the gate 18 sliding against the seal 34. Thus, the seal 34 may be a low drag seal.

The protruding portion 158 may have a convex shape extending longitudinally for sealing against the outlet facing surface 24. The convex shape may be centrally disposed along the normal axis N for spreading force equally to the leg portions 160, 162.

When the seal 34 is assembled with the gate 18 and valve body 12, the protruding portion may compress against the inlet facing surface 22 to increase a sealing force against the gate 18 and to transfer a compressive force to the leg portions 60, 62. The compressive force may cause the leg portions 60, 62 to compress against the surface of the channel 30, thereby increasing a sealing force against the channel 30.

The seal assembly 20 may further include wipers 68, 70 on opposite sides of the protruding portion 58. The wipers 68, 70 provide a rigid surface to protect the protruding portion 58 from damage due to particulate that may accumulate on the inlet facing surface 22. When the gate 18 opens or closes, the wipers 68, 70 slide against the inlet facing surface 22 to wipe away particulate or debris before it can reach the protruding portion 58. In an embodiment, only a single wiper may be provided. For example, only wiper 68 may be provided. In another embodiment no wiper is provided.

Referring specifically to FIG. 4, a wedging element 36 is provided between the inlet seal portion 44 and the valve body 12 for providing force along the lateral axis Z in response to longitudinal force exerted against the cam assembly 36. Because the wedging element operates via the interaction of cam surfaces, the wedging element alternatively is referred to as a cam assembly 36. The cam assembly 36 may include a plurality of first cam components 72 and second cam components 74 that are longitudinally aligned. For example, four first cam components 72 and four second cam components 74 may be longitudinally aligned side by side, respectively. Multiple longitudinally aligned first and second cam components 72, 74 allows each cam component 72, 74 to have a thicker lateral length compared to one longitudinally extending cam component extending the entire longitudinal length of the aligned cam components 72, 74. In an embodiment, only a single cam component 72 and a single second cam component 74 are provided.

Each second cam component 74 may be fixed relative to the valve body 12. A longitudinal end of each second cam component 74 may abut either the valve body 12 or another second cam component 74 to prevent longitudinal movement. In an embodiment, the second cam components and the valve body are one-piece. In another embodiment, each second cam component is longitudinally slidable relative to the valve body.

Each second cam component 74 may have a valve body surface 76 and a second surface 78, opposite the valve body surface 76. The valve body surface 76 may engage the valve body 12, and the second surface 78 may engage the cam surface 82 of the first cam component 72.

The valve body surface 76 may be generally planar and generally parallel with the normal axis and the longitudinal axis $L_1$. In an embodiment, the valve body surface is oriented in any other suitable manner. For example, the valve body surface may be inclined relative to the inlet facing surface to allow each second cam component to be fixed relative to the valve body.

The second surface 78 may be generally planar and inclined relative to the valve body surface 76. For example, the second surface 78 may be inclined longitudinally to allow the first cam component 72 to slide laterally as the first cam component 72 moves longitudinally along the second cam component 74.

A longitudinal end of each second cam component 74 adjacent a fastener passage 80 in the valve body 12 may abut a ledge in the valve body 12. The longitudinal end adjacent the fastener passage 80 may have a lateral thickness less than the corresponding ledge and an opposite end of the second cam component 74. As illustrated, the end of the second cam component 74 adjacent the fastener passage 80 is offset from the fastener passage 80. Offsetting the fastener passage 80 allows the fastener to extend toward the first cam component 72 without abutting the second cam component 74.

The first cam components 72 are slidable relative to the second cam components 74 to perform a wedging action against the cam facing surface 56 of the inlet seal portion 44. Each first cam component 72 may include a cam surface 82 for engaging the second cam component 74 and a seal surface 84 for engaging the inlet seal portion 44.

The cam surface 82 may be parallel with the normal axis and inclined longitudinally to allow the first cam component 72 to move laterally as the first cam component 72 slides longitudinally along the second cam component 74.

As the first cam component 72 slides longitudinally the wedge configuration of the seal surface 84 translates such movement into a lateral force against the cam facing surface 56.

Specifically, the seal surface 84 moves laterally against the cam facing surface 56 to increase a sealing force of the gate facing surface 45 against the inlet facing surface 22 of the gate 18.

The seal surface 84 may define a plane that does not rotate as the seal surface 84 moves. In other words, the orientation of the seal surface 84 may remain fixed as its position changes. As the seal surface 84 moves longitudinally, the seal surface 84 also moves in a direction that is non-parallel with the defined plane of the seal surface 84. For example, the seal surface 84 may move laterally as it moves longitudinally. The non-parallel movement allows the seal surface 84 to exert a compressive force against the cam facing surface 56 to increase the sealing force of the gate facing surface 45 against the inlet facing surface 22 of gate 18. Alternatively, the seal surface 84 may move longitudinally in an opposite direction to decrease the sealing force of the gate facing surface 45 against the inlet facing surface 22 of gate 18.

The alignment and abutment of each first cam component 72 allows each first cam component 72 to move together. For example, a fastener may be inserted into the fastener passage 80 and adjusted to move the adjacent first cam component 72 into the next first cam component 72, which translates the movement from the previous first cam component 72 until the furthest first cam component 72 slides toward and possibly into a fastener passage 104.

In an embodiment, each first cam component is fixed relative to the valve body and each second cam component moves longitudinally such that the second surface of the second cam component exerts compressive force as a function of how far it moves longitudinally.

The side portions 48, 50 of the seal 34 are disposed at either side of and abut the gate 18. The side portions 48, 50 include the o-ring channels 52, 54 for housing the o-ring 40 at a side of the gate 18.

Referring to FIGS. 4-6, the valve body 12 may include an o-ring channel 110 extending along a side of the gate 18 (not illustrated), as well as a corresponding o-ring channel 112 (FIG. 8) extending along an opposite side of the gate 18. The o-ring channel 110 and opposite o-ring channel 112 bound the o-ring 40 and extend along the normal axis N to align with the o-ring channels 52, 54 of the seal 34.

The side portions 48, 50 include lateral recesses 90 to allow a fastener 86 (FIG. 8) to translate the first cam component 72 or second cam component 74 without interfering with the side portions 48, 50. For example, the valve body 12 may include recesses 90 adjacent each fastener passage 80, 102, 104, 106 in the valve body 12 to allow a corresponding fastener to reach the corresponding first or second cam component 72, 74.

The fastener passage 80 and the second fastener passage 102 (illustrated in FIGS. 1 and 4) to allow a fastener, such as fastener 86 (FIG. 8) to longitudinally force the corresponding cam assembly 36, 38 to exert more force against the seal 34. As best shown in FIG. 4, the valve body 12 may include fastener passages 104, 106 opposite the first and second fastener passages 80, 102 relative to the gate 18. The fastener passage 104, 106 allow fastener 86 (FIG. 8) to provide a maximum threshold for movement of the corresponding cam assembly 36, 38. In an embodiment, the fastener is able to longitudinally force the corresponding cam assembly to exert less force against the inlet seal portion or the outlet seal portion of seal.

Figure 8:
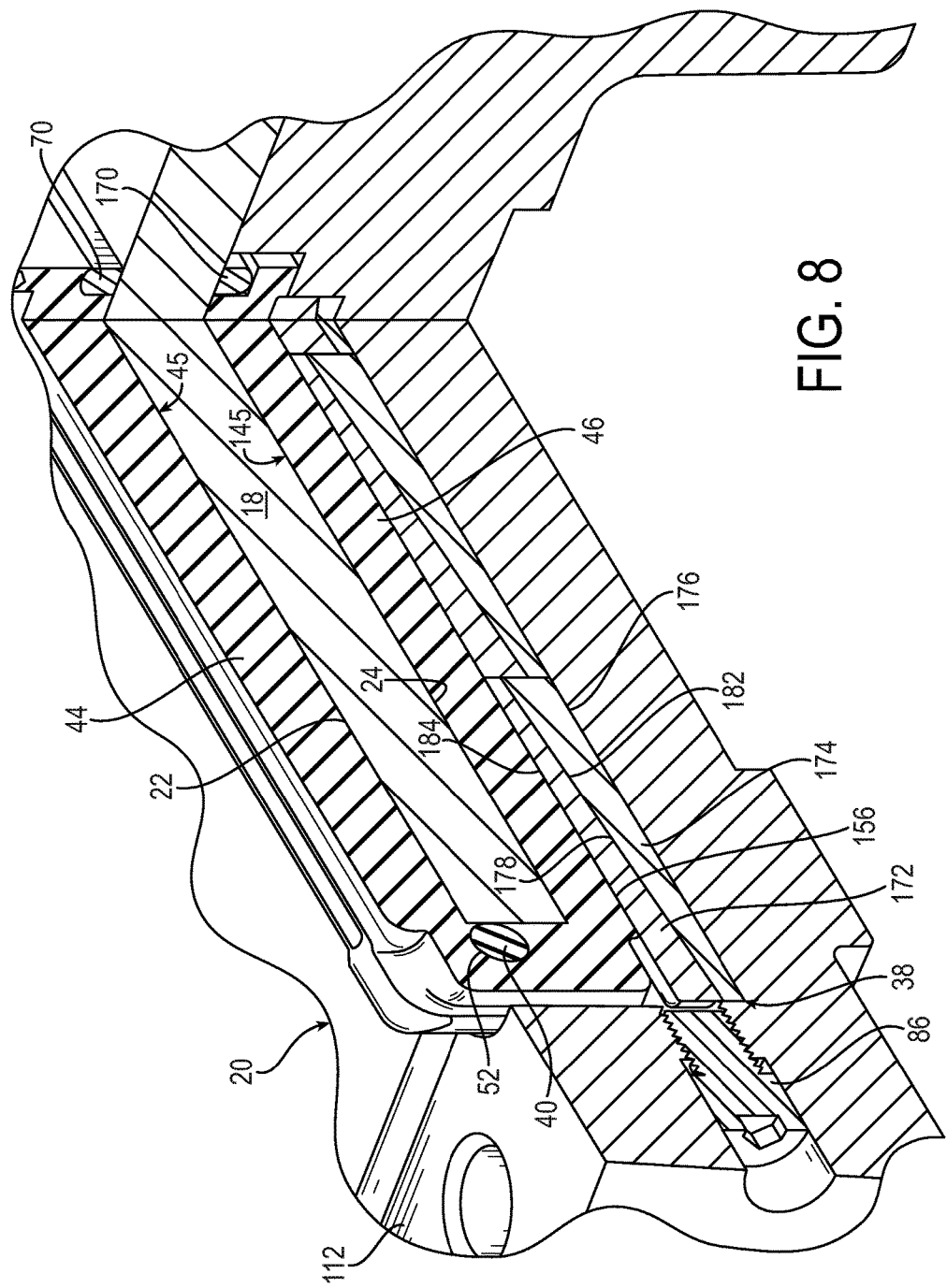
FIG. 8 is a drawing depicting a cross-section of a bottom portion of the gate valve assembly of FIG. 1 including the seal assembly.
Figure 9:
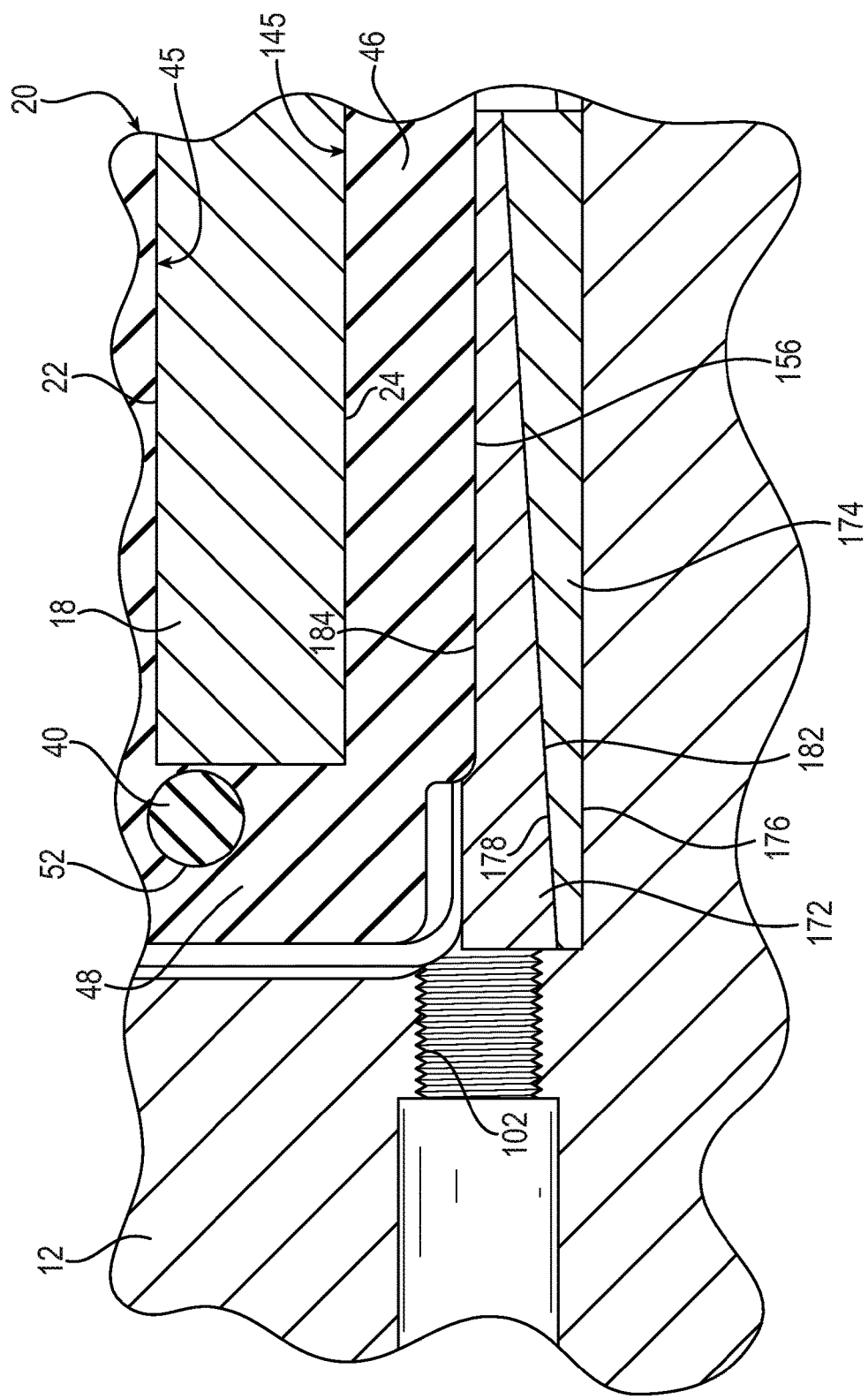
FIG. 9 is a drawing depicting a cross-section of a portion of the gate valve assembly of FIG. 1.

Referring to FIGS. 8 and 9, the outlet seal portion 46 has the gate facing surface 145 and a cam facing surface 156 opposite the gate facing surface 145. The gate facing surface 145 extends along the longitudinal axis $L_1$ and abuts the outlet facing surface 24 of the gate 18. The cam facing surface 156 extends along the longitudinal axis $L_2$ and abuts the cam assembly 136.

When the seal 34 is assembled with the gate 18 and valve body 12, the protruding portion may compress against the outlet facing surface 24 to increase a sealing force against the gate 18 and to transfer a compressive force to the leg portions 160, 162. The compressive force may cause the leg portions 160, 162 to compress against the surface of the channel 32, thereby increasing a sealing force against the channel 32.

The seal assembly 20 may further include wipers 168, 170 (FIG. 6) on opposite sides of the protruding portion 158. The wipers 168, 170 provide a rigid surface to protect the protruding portion 158 from damage due to particulate that may accumulate on the outlet facing surface 24. When the gate 18 opens or closes the wipers 168, 170 slide against the outlet facing surface 24 to wipe away particulate or debris before it can reach the protruding portion 158. In an embodiment, only a single wiper may be provided. For example, only wiper 168 may be provided. In another embodiment no wiper is provided.

A wedging element 38 is provided opposite the cam assembly 36 (shown in FIG. 4), between the outlet seal portion 46 and the valve body 12 for providing force along the lateral axis Z in response to longitudinal force exerted against the wedging element 38. Because the wedging element 38 operates via the interaction of cam surfaces, the wedging element alternatively is referred to as a cam assembly 38. The cam assembly 38 may include a plurality of first cam components 172 and second cam components 174 that are longitudinally aligned. For example, four first cam components 172 and four second cam components 174 may be longitudinally aligned side by side, respectively. Multiple longitudinally aligned first and second cam components 172, 174 allows each cam component 172, 174 to have a thicker lateral length compared to one longitudinally extending cam component extending the entire longitudinal length of the aligned cam components 172, 174. In an embodiment, only a single cam component 172 and a single second cam component 174 are provided.

Each second cam component 174 may be fixed relative to the valve body 12. A longitudinal end of each second cam component 174 may abut either the valve body 12 or another second cam component 174 to prevent longitudinal movement. In an embodiment, the second cam components and the valve body are one-piece. In another embodiment, each second cam component is longitudinally slidable relative to the valve body.

Each second cam component 174 may have a valve body surface 176 and a second surface 178, opposite the valve body surface 176. The valve body surface 176 may engage the valve body 12 and the second surface 178 may engage the cam surface 182 of the first cam component 172.

The valve body surface 176 may be generally planar and generally parallel with the normal axis and the longitudinal axis $L_2$. In an embodiment, the valve body surface is oriented in any other suitable manner. For example, the valve body surface may be inclined relative to the outlet facing surface 24 to allow each second cam component to be fixed relative to the valve body.

The second surface 178 may be generally planar and inclined relative to the valve body surface 176. For example, the second surface 178 may be inclined longitudinally to allow the first cam component 172 to slide laterally as the first cam component 172 moves longitudinally along the second cam component 174.

A longitudinal end of each second cam component 174 adjacent the fastener passage 102 in the valve body 12 may abut a ledge in the valve body 12. The longitudinal end adjacent the fastener passage 102 may have a lateral thickness less than the corresponding ledge and an opposite end of the second cam component 174. As illustrated, the end of the second cam component 174 adjacent the fastener passage 102 is offset from the fastener passage 102. Offsetting the fastener passage 102 allows the fastener to extend toward the first cam component 172 without abutting the second cam component 174.

The first cam components 172 are slidable relative to the second cam components 174 to perform a wedging action against the cam facing surface 156 of the outlet seal portion 46. Each first cam component 172 may include a cam surface 182 for engaging the second cam component 174 and a seal surface 84 for engaging the outlet seal portion 46.

The cam surface 182 may be parallel with the normal axis and inclined longitudinally to allow the first cam component 172 to move laterally as the first cam component 172 slides longitudinally along the second cam component 174.

As the first cam component 172 slides longitudinally the wedge configuration of the seal surface 184 translates such movement into a lateral force against the cam facing surface 156.

Specifically, the seal surface 184 moves laterally against the cam facing surface 156 to increase a sealing force of the gate facing surface 45 against the outlet facing surface 24 of the gate 18.

The seal surface 184 may define a plane that does not rotate as the seal surface 184 moves. In other words, the orientation of the seal surface 184 may remain fixed as its position changes. As the seal surface 184 moves longitudinally, the seal surface 184 also moves in a direction that is non-parallel with the defined plane of the seal surface 184. For example, the seal surface 184 may move laterally as it moves longitudinally. The non-parallel movement allows the seal surface 184 to exert a compressive force against the cam facing surface 156 to increase the sealing force of the gate facing surface 145 against the outlet facing surface 24 of gate 18. Alternatively, the seal surface 184 may move longitudinally in an opposite direction to decrease the sealing force of the gate facing surface 145 against the outlet facing surface 24 of gate 18.

The alignment and abutment of each first cam component 172 allows each first cam component 172 to move together. For example, a fastener may be inserted into the fastener passage 102 and adjusted to move the adjacent first cam component 172 into the next first cam component 172, which translates the movement from the previous first cam component 172 until the furthest first cam component 172 slides toward and possibly into a fastener passage 106.

In an embodiment, each second cam is fixed relative to the valve body and the first cam moves longitudinally such that the second surface of the first cam exerts compressive force as a function of how far it moves longitudinally.

The second cam assembly 38 may engage with the cam facing surface 156 of the seal 34 in a comparable manner to the first cam assembly 36 engaging the cam facing surface 56 of the seal 34. Thus, the cam assembly 26 can adjustably engage and seal 34 and compressing the cam facing surface 56 increases the sealing force of the gate facing surface 45 against the inlet facing surface 22 of the gate 18.

During use a fastener 86, such as a set screw, is inserted into the fastener passage 80 (FIG. 4) and/or the fastener passage 102 (and engaged with the first cam component 72, 172 to slide the first cam component 72, 172 longitudinally. Sliding the first cam component 72 longitudinally allows the sealing force of the seal 34 to be adjusted. For example, sliding the first cam component 72, 172 longitudinally in a direction toward the fastener passage 104, 106 may increase the sealing force exerted on the seal 34. Thus, sliding the first cam component 72, 172 longitudinally in a toward the fastener passage 80, 102 may decrease the sealing force exerted on the seal 34.

Figure 10:
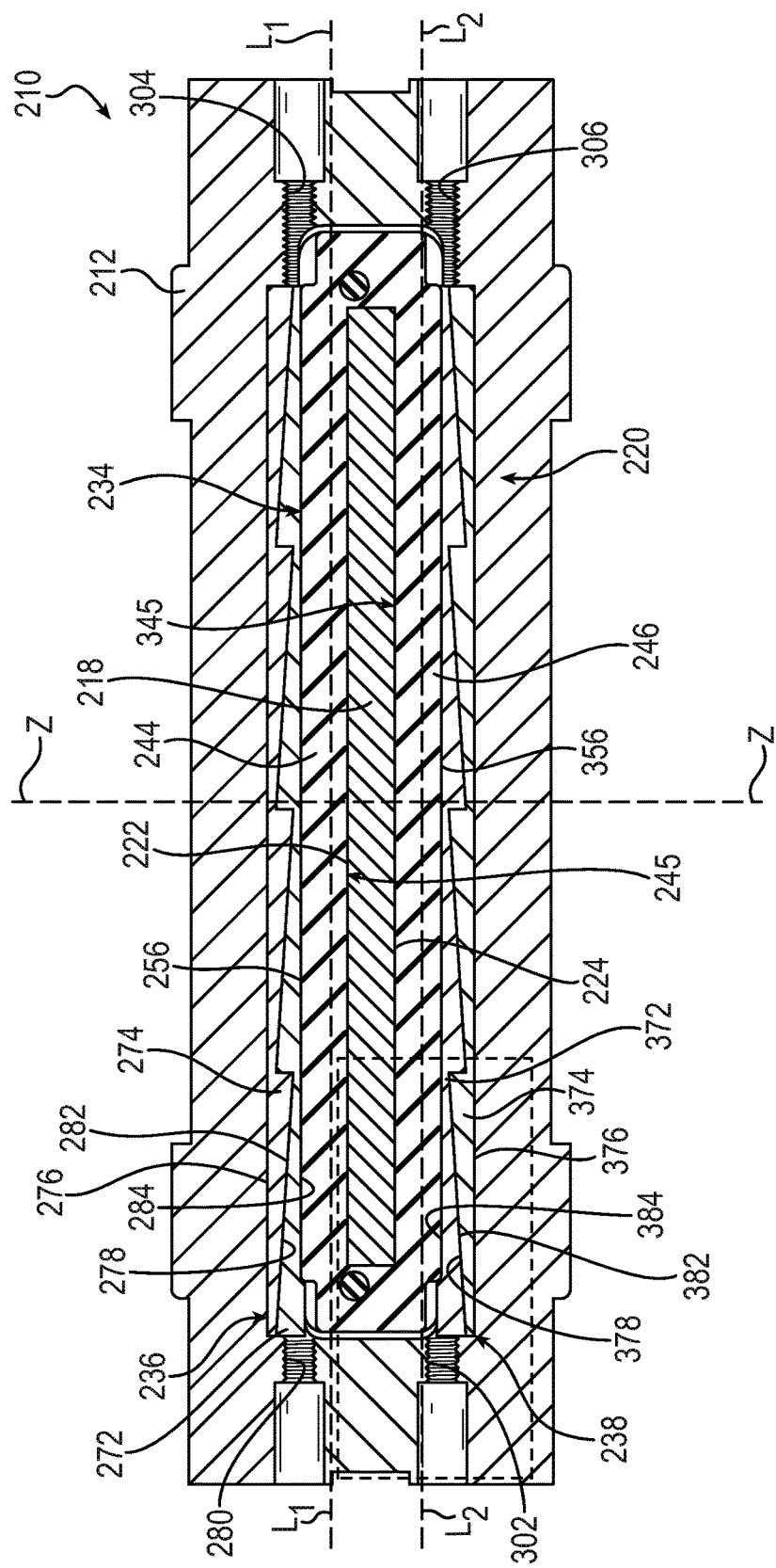
FIG. 10 is a drawing depicting a cross-section of another exemplary gate valve assembly.
Figure 11:
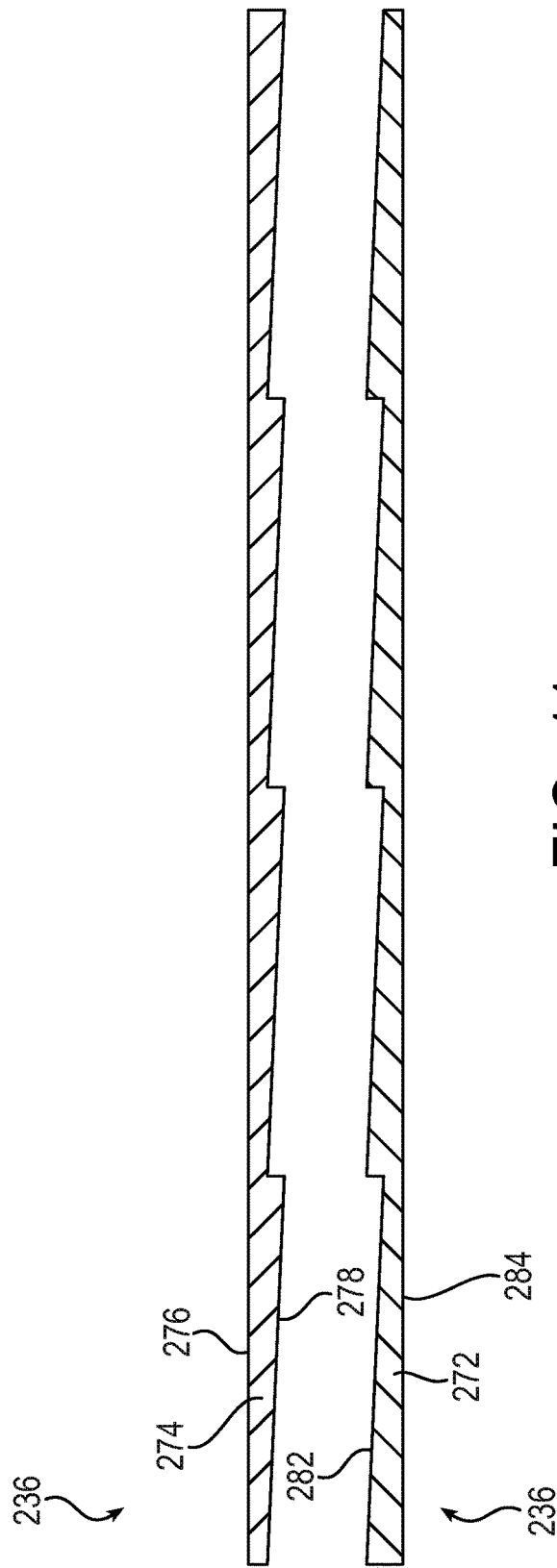
FIG. 11 is a drawing depicting an exploded cross-section view of an exemplary cam assembly of the gate valve assembly of FIG. 10.

Turning now to FIGS. 10 and 11, an exemplary embodiment of the gate valve assembly is shown at 210. The gate valve assembly 210 is substantially the same as the above-referenced gate valve assembly 10, and consequently the same reference numerals but indexed by 200 are used to denote structures corresponding to similar structures in the gate valve assemblies. In addition, the foregoing description of the gate valve assembly 10 is equally applicable to the gate valve assembly 210 except as noted below. Moreover, it will be appreciated upon reading and understanding the specification that aspects of the gate valve assemblies 10, 210 may be substituted for one another or used in conjunction with one another where applicable.

The gate valve assembly 210 includes a valve body 212 having an inlet (not shown) an outlet (not shown), a gate 218, and a seal assembly 220. The gate 218 is disposed within and slidable within the valve body 212 to open or close the gate valve assembly 210.

The seal assembly 220 may include a seal 234 that extends along one or both longitudinal axes $L_1$, $L_2$. The longitudinal axes $L_1$, $L_2$ are perpendicular to the normal axis (not shown) and extend along the gate 218 such that the gate 218 slides against the seal 234 when the gate slides between the open position and the closed position.

Cam assemblies 236, 238, also referred to as wedging elements, may abut the seal 234 opposite the gate 218. The cam assemblies 236, 238 are able to exert a compressive force on the seal 234 to increase sealing force of the seal 234 against the gate 218. The cam assemblies 236, 238 may also decrease the sealing force of the seal 234 against the gate 218.

Each cam assembly 236, 238 may include a first cam 272, 372 and/or a second cam 274, 374, also referred to as wedging elements. Each first cam 272, 372 is engageable with the seal 234 and the second cam 274, 374 such that movement of the first cam 272, 372 along the corresponding longitudinal axis $L_1$, $L_2$ causes the first cam 272, 372 to exert a force against the seal 234 along a lateral axis Z perpendicular to the longitudinal axes $L_1$, $L_2$.

The seal assembly 220 may include the first cam 272, 372 and/or the second cam 274, 374, as well as the seal 234, which extends along the longitudinal axis $L_1$ and/or longitudinal axis $L_2$. The seal assembly 220 may be placed into the valve body 212 prior to assembly of the gate valve assembly 210.

The wedging elements 236, 238 operates similarly to the wedging elements 36, 38 for providing force along the lateral axis Z in response to longitudinal force exerted against the cam assemblies 236, 238. Because the wedging element operates via the interaction of cam surfaces, the wedging elements alternatively is referred to as a cam assembly 236, 238.

The cam assembly 236, similar to the cam assembly 36, may include a first cam component 272 and a second cam component 274. The first cam component 272 may include a plurality of cam surfaces 282 that are longitudinally aligned. Thus, the first cam component 272 may be one-piece in contrast to the plurality of first cam components 72 of the cam assembly 36 of FIG. 4. The first cam component 272 being one-piece reduces assembly components and allows for easier assembly of the cam assembly 236.

The second cam component 274, similarly, may include a plurality of second surfaces 278 that are longitudinally aligned. Thus, the second cam component 274 may be one-piece in contrast to the plurality of second cam components 74 of the cam assembly 36 of FIG. 4. The cam component 272 being one-piece allows for easier assembly of the cam assembly 236.

For example, four first second surfaces 278 and four cam surfaces 282 may be longitudinally aligned side by side, respectively. Multiple longitudinally aligned second surfaces 278 and cam surfaces 282 allows each cam component 272, 274 to have a thicker lateral length compared to one longitudinally extending second surface or cam surface cam extending the entire longitudinal length of the aligned cam components 272, 274. In an embodiment, only a single second surface and a single cam surface are provided.

The second cam component 274 may be fixed relative to the valve body 212. A longitudinal end of the second cam component 274 may abut either the valve body 212 or another second cam component 274 to prevent longitudinal movement. In an embodiment, the second cam component and the valve body are one-piece. In another embodiment, the second cam component is longitudinally slidable relative to the valve body.

The second cam component 274 may have a valve body surface 276 and a plurality of second surfaces 278, opposite the valve body surface 276. The valve body surface 276 may engage the valve body 212, and each second surface 278 may engage the corresponding cam surface 282 of the first cam component 272.

The valve body surface 276 extends longitudinally along the cam surfaces 278 and may be generally planar and generally parallel with the normal axis and the longitudinal axis $L_1$. In an embodiment, the valve body surface is oriented in any other suitable manner. For example, the valve body surface may be inclined relative to the inlet facing surface to allow the second cam component to be fixed relative to the valve body.

The second surface 278 may be generally planar and inclined relative to the valve body surface 276. For example, the second surface 278 may be inclined longitudinally to allow the first cam component 272 to slide laterally as the first cam component 272 moves longitudinally along the second cam component 274.

A longitudinal end of the second cam component 274 adjacent a fastener passage 280 in the valve body 212 may abut a ledge in the valve body 212. The longitudinal end adjacent the fastener passage 280 may have a lateral thickness less than the corresponding ledge and an opposite end of the second cam component 274. As illustrated, the end of the second cam component 274 adjacent the fastener passage 280 is offset from the fastener passage 280. Offsetting the fastener passage 280 allows the fastener to extend toward the first cam component 272 without abutting the second cam component 274.

The first cam component 272 is slidable relative to the second cam component 274 to perform a wedging action against the cam facing surface 256 of the inlet seal portion 244. Each first cam component 272 may include the cam surface 282 for engaging the second cam component 274 and a seal surface 284 for engaging the inlet seal portion 244 laterally opposite the cam surface 282.

The cam surface 282 may be parallel with the normal axis and inclined longitudinally to allow the first cam component 272 to move laterally as the first cam component 272 slides longitudinally along the second cam component 274.

As the first cam component 272 slides longitudinally the wedge configuration of the seal surface 284 translates such movement into a lateral force against the cam facing surface 256.

Specifically, the seal surface 284 moves laterally against the cam facing surface 256 to increase a sealing force of the gate facing surface 245 against the inlet facing surface 222 of the gate 218.

The seal surface 284 may define a plane that does not rotate as the seal surface 284 moves. In other words, the orientation of the seal surface 284 may remain fixed as its position changes. As the seal surface 284 moves longitudinally, the seal surface 284 also moves in a direction that is non-parallel with the defined plane of the seal surface 284.

For example, the seal surface 284 may move laterally as it moves longitudinally. The non-parallel movement allows the seal surface 284 to exert a compressive force against the cam facing surface 256 to increase the sealing force of the gate facing surface 245 against the inlet facing surface 222 of gate 218. Alternatively, the seal surface 284 may move longitudinally in an opposite direction to decrease the sealing force of the gate facing surface 245 against the inlet facing surface 222 of gate 218.

The single-piece nature of first cam component 272 allows each cam surface 282 to move together. For example, a fastener may be inserted into the fastener passage 280 and adjusted to move the adjacent first cam component 272 and corresponding cam surface 282, which translates each cam surface 282 at the same time toward and possibly into a fastener passage 304.

In an embodiment, the first cam component is fixed relative to the valve body and the second cam component moves longitudinally such that the second surface of the second cam component exerts compressive force as a function of how far it moves longitudinally.

The cam assembly 238, similar to the cam assembly 38, may include a first cam component 372 and a second cam component 374. The cam component 372 may include a plurality of cam surfaces 382 that are longitudinally aligned. Thus, the cam component 372 may be one-piece in contrast to the plurality of cam components 172 of the cam assembly 38 of FIG. 4. The cam component 372 being one-piece reduces assembly components and allows for easier assembly of the cam assembly 38.

The second cam component 374, similarly, may include a plurality of second surfaces 378 that are longitudinally aligned. Thus, the second cam component 374 may be one-piece in contrast to the plurality of second cam components 174 of the cam assembly 38 of FIG. 4. The cam component 372 being one-piece allows for easier assembly of the cam assembly 238.

For example, four first second surfaces 378 and four cam surfaces 382 may be longitudinally aligned side by side, respectively. Multiple longitudinally aligned second surfaces 378 and cam surfaces 382 allows each cam component 372, 374 to have a thicker lateral length compared to one longitudinally extending second surface or cam surface cam extending the entire longitudinal length of the aligned cam components 372, 374. In an embodiment, only a single second surface and a single cam surface are provided.

The second cam component 374 may be fixed relative to the valve body 212. A longitudinal end of the second cam component 374 may abut either the valve body 212 or another second cam component 374 to prevent longitudinal movement. In an embodiment, the second cam component and the valve body are one-piece. In another embodiment, the second cam component is longitudinally slidable relative to the valve body.

The second cam component 374 may have a valve body surface 376 and a plurality of second surfaces 378, opposite the valve body surface 376. The valve body surface 376 may engage the valve body 212, and each second surface 378 may engage the corresponding cam surface 382 of the first cam component 372.

The valve body surface 376 extends longitudinally along the cam surfaces 378 and may be generally planar and generally parallel with the normal axis and the longitudinal axis $L_2$. In an embodiment, the valve body surface is oriented in any other suitable manner. For example, the valve body surface may be inclined relative to the inlet facing surface to allow the second cam component to be fixed relative to the valve body.

The second surface 378 may be generally planar and inclined relative to the valve body surface 376. For example, the second surface 378 may be inclined longitudinally to allow the first cam component 372 to slide laterally as the first cam component 372 moves longitudinally along the second cam component 374.

A longitudinal end of the second cam component 374 adjacent a fastener passage 302 in the valve body 212 may abut a ledge in the valve body 212. The longitudinal end adjacent the fastener passage 302 may have a lateral thickness less than the corresponding ledge and an opposite end of the second cam component 374. As illustrated, the end of the second cam component 374 adjacent the fastener passage 302 is offset from the fastener passage 302. Offsetting the fastener passage 302 allows the fastener to extend toward the first cam component 372 without abutting the second cam component 374.

The first cam component 372 is slidable relative to the second cam component 374 to perform a wedging action against the cam facing surface 356 of the outlet seal portion 246. Each first cam component 372 may include the cam surface 382 for engaging the second cam component 374 and a seal surface 384 for engaging the outlet seal portion 246 laterally opposite the cam surface 382.

The cam surface 382 may be parallel with the normal axis and inclined longitudinally to allow the first cam component 372 to move laterally as the first cam component 372 slides longitudinally along the second cam component 374.

As the first cam component 372 slides longitudinally the wedge configuration of the seal surface 384 translates such movement into a lateral force against the cam facing surface 356.

Specifically, the seal surface 384 moves laterally against the cam facing surface 356 to increase a sealing force of the gate facing surface 345 against the outlet facing surface 224 of the gate 218.

The seal surface 384 may define a plane that does not rotate as the seal surface 384 moves. In other words, the orientation of the seal surface 384 may remain fixed as its position changes. As the seal surface 384 moves longitudinally, the seal surface 384 also moves in a direction that is non-parallel with the defined plane of the seal surface 384. For example, the seal surface 384 may move laterally as it moves longitudinally. The non-parallel movement allows the seal surface 384 to exert a compressive force against the cam facing surface 356 to increase the sealing force of the gate facing surface 345 against the outlet facing surface 224 of gate 218. Alternatively, the seal surface 384 may move longitudinally in an opposite direction to decrease the sealing force of the gate facing surface 345 against the outlet facing surface 224 of gate 218.

The single-piece nature of first cam component 372 allows each cam surface 382 to move together. For example, a fastener may be inserted into the fastener passage 302 and adjusted to move the adjacent first cam component 372 and corresponding cam surface 382, which translates each cam surface 382 at the same time toward and possibly into a fastener passage 306.

Turning now to FIGS. 12-16, an exemplary embodiment of the gate valve assembly is shown at 410. The gate valve assembly 410 is substantially the same as the above-referenced gate valve assembly 10. In addition, the foregoing description of the gate valve assembly 10 is equally applicable to the gate valve assembly 410 except as noted below. Moreover, it will be appreciated that aspects of the gate valve assemblies may be substituted for one another or used in conjunction with one another where applicable.

Figure 12:
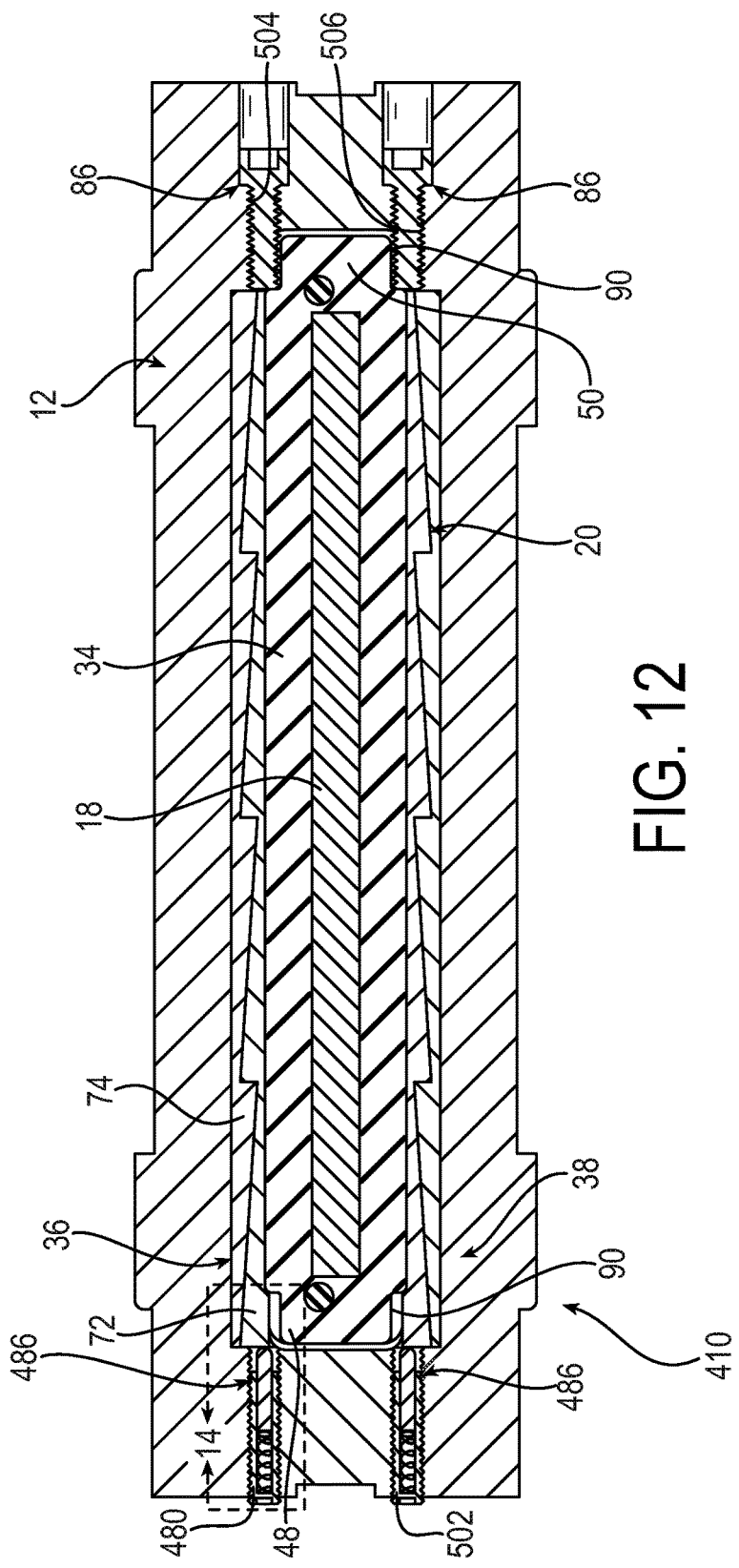
FIG. 12 is a drawing depicting a cross-section of another exemplary gate valve assembly.

Referring initially to FIG. 12, the gate valve assembly 410 is illustrated. The gate valve assembly 10 includes a valve body 12, a gate 18, and a seal assembly 20. The gate 18 is disposed within and slidable within the valve body 12 to open or close the gate valve assembly 10.

The seal assembly 20 may include a seal 34 with side seal portions 48, 50, which include lateral recesses 90. The lateral recesses 90 allow a fastener 86 or a fastener 486 to translate the first cam component 72 or second cam component 74 without interfering with side seal portions 48, 50 of the seal 34.

Each fastener 86, 486 may engage a fastener passage 480, 502, 504, 506 to longitudinally force a corresponding cam assembly 36, 38 to exert more or less force against the seal 34. The fastener passages 480, 502, 504, 506 may be inwardly threaded for engaging the fasteners 86, 486.

Figure 13:
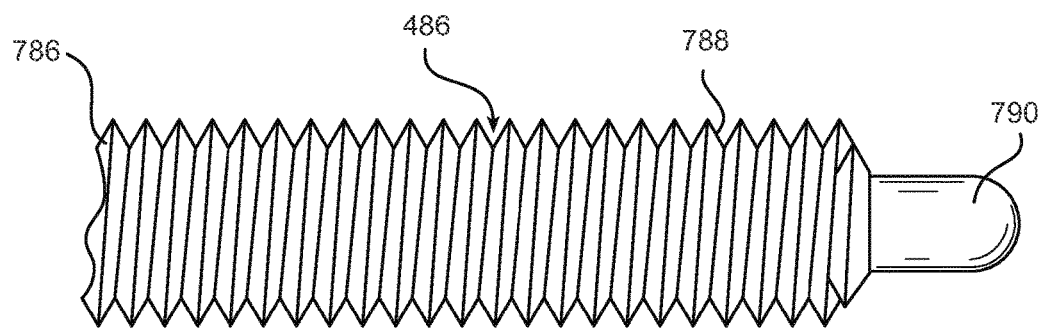
FIG. 13 is a drawing depicting side view of a fastener of FIG. 12.

As shown in FIG. 13, the fastener 486 may be self-adjusting. For example, the fastener 486 may be a spring pin assembly. The fastener 486 may include a body 786 that forms threading 788 and the fastener may include a piston 790 that is longitudinally extendable away from the body 786.

For example, while in the extended state shown in FIG. 13, the piston 790 may resiliently resist retraction longitudinally into the body 786. From a retracted position, the piston 790 may be extended away from the body 786. As the piston 790 extends longitudinally from the body 786, the piston 790 may exert a longitudinal force against the cam assembly 36, as shown in FIG. 12.

Figure 14:
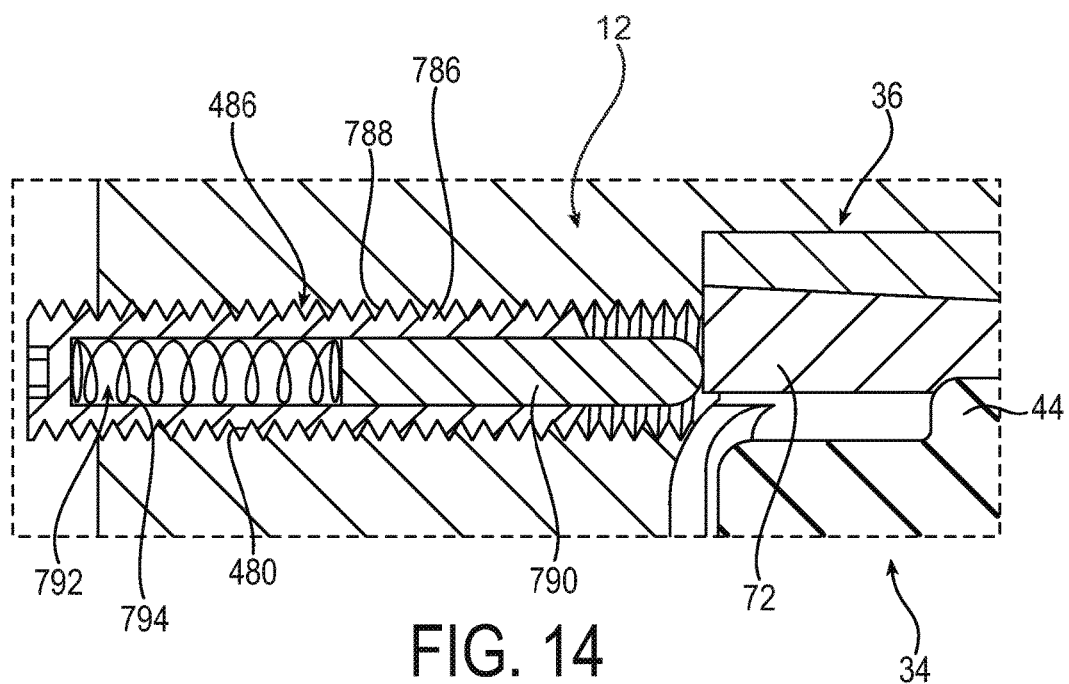
FIG. 14 is a drawing depicting a cross-section of the fastener of the gate valve assembly of FIG. 12 in an unsecured position.

Turning to FIG. 14, the fastener 486 is illustrated in an unsecured position where the fastener 486 is not exerting any longitudinal biasing force against the first cam component 72.

The valve body 12 may include fastener passage 480 for engaging radially outward threading 788 of the fastener 486. The body 786 may define a central passage 792, which may be cylindrical and may extend from a longitudinal end of the body 786 to allow extension and retraction of the piston 790.

The fastener 486 may also include a resilient member 794 disposed within the central passage 792 of the body 786. The resilient member 794 may abut an internal longitudinally facing surface of the body 786 and an opposite facing surface of the piston 790 to resist longitudinal movement of the piston 790 into the body 786. FIG. 14 illustrates the resilient member 794 in a neutral state, and thus not providing any longitudinal biasing force against the body 786 or the piston 790.

The central passage 792 allows the resilient member 794 to longitudinally compress and de-compress as the piston 790 engages the first cam component 72 of the cam assembly 36 while the body 786 moves longitudinally relative to the piston 790.

Any of the fasteners 86, 486 may be self-adjusting. When the fastener 486 is self-adjusting the fastener 486 may exert a longitudinal force against the first cam component 72 to exert a compressive lateral force against the seal 34 if the seal reduces in thickness. As the lateral thickness of an inlet seal portion 44 of the seal 34 reduces, the lateral compressive force exerted on the inlet seal portion 44 may reduce. As the first cam component 72 moves longitudinally relative to the body 786, the lateral compressive force from the first cam component 72 against the seal 34 may increase, as discussed above. The increase of compressive force from the first cam component 72 may at least partially counteract the reduction of compressive force due to the reduced lateral thickness of the inlet seal portion 44.

Figure 15:
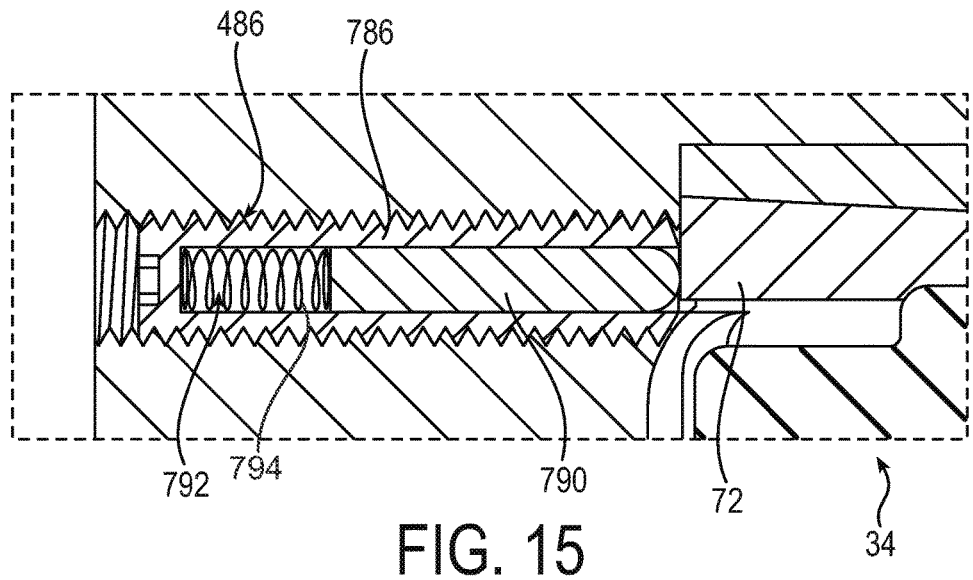
FIG. 15 is a drawing depicting a cross-section of the fastener of the gate valve assembly of FIG. 12 in a secured position.

For example, the piston 790 may initially abut the first cam component 72 after initial assembly, as shown in FIG. 15. As the seal 34 reduces in thickness, the resilient member 794 may urge the piston 790 longitudinally to continue to engage the first cam component 72 to exert a lateral force against the seal 34 as the first cam component 72 moves longitudinally relative to the body 786.

FIG. 15 illustrates the fastener 486 in a secured position where the piston 790 is engaged with the first cam component 72 and receded into the central passage 792 to compress the resilient member 794. The piston 790 is moveable relative to the body 786 to self-adjust the first cam component 72 when the seal 34 reduces in lateral thickness.

Figure 16:
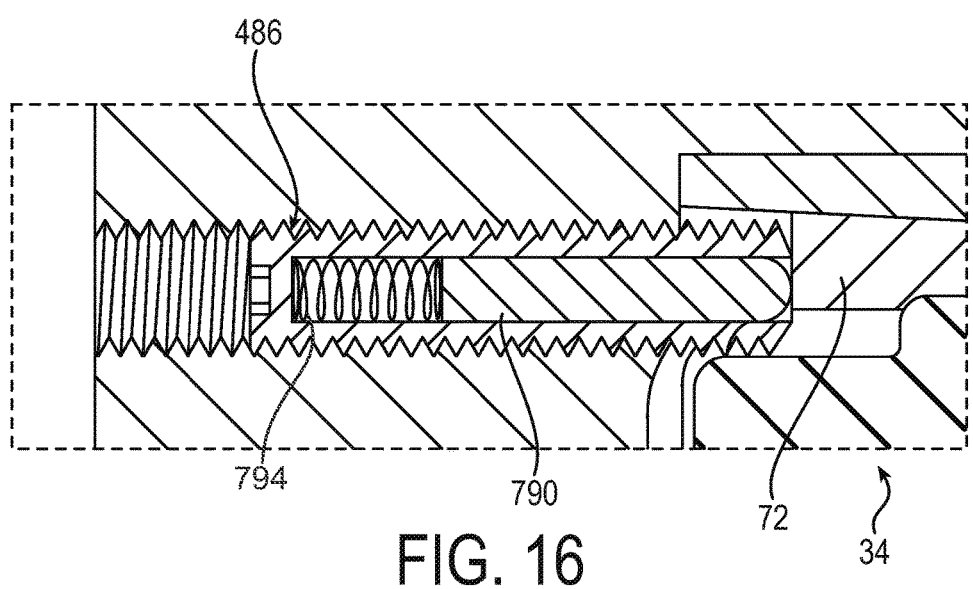
FIG. 16 is a drawing depicting a cross-section of the fastener of the gate valve assembly of FIG. 12 in an extended secured position.

If desired, the fastener 486 may be in an extended secured position, as illustrated in FIG. 16, where the piston 790 is fully recessed into the central passage 792 and the body 786 is longitudinally displacing the first cam component 72 to exert an additional lateral compressive force upon the seal 34. The longitudinally opposite fastener 86 in the fastener passage 504 (shown in FIG. 12) may be longitudinally recessed to accommodate the longitudinal displacement of the first cam component 72, or to accommodate future potential longitudinal displacement of the first cam component 72 away from the fastener 486.

In an embodiment, the first cam component is fixed relative to the valve body and the second cam component moves longitudinally such that the second surface of the second cam component exerts compressive force as a function of how far it moves longitudinally.

An aspect of the invention, is a gate valve assembly comprising a valve body having an inlet and an outlet, a gate disposed within the valve body and slidably connected to the valve body such that the gate slides along a normal axis between an open position to a closed position, wherein in the closed position the inlet is fluidly disconnected from the outlet, a seal having a longitudinal axis perpendicular to the normal axis and extending along the gate such that the gate slides against a first seal surface of the seal when the gate slides between the open position and the closed position, and a wedging element abutting a second seal surface of the seal opposite the first seal surface, wherein the wedging element comprises a front side for engaging the second seal surface and a backside for engaging an opposite wedge surface such that movement of the wedging element along the longitudinal axis causes the wedging element to exert a force against the seal along a lateral axis perpendicular to the longitudinal axis.

In an exemplary embodiment of the gate valve assembly, the gate valve assembly further comprises a second wedging element forming the opposite wedge surface, wherein the second wedging element is disposed between the valve body and the back side of the wedging element.

In an exemplary embodiment of the gate valve assembly, the back side of the wedging element is planar and inclined longitudinally to allow the wedging element to slide laterally as the wedging element moves longitudinally along the second wedging element.

In an exemplary embodiment of the gate valve assembly, the front side of the wedging element is planar and parallel with the second seal surface of the seal.

In an exemplary embodiment of the gate valve assembly, the back side of the wedging element is planar and parallel with the opposite wedge surface.

In an exemplary embodiment of the gate valve assembly, the first seal surface of the seal formed by a protruding portion opposite the second seal surface abutting the wedging element.

In an exemplary embodiment of the gate valve assembly, the protruding portion includes a convex portion for sealing against the gate.

In an exemplary embodiment of the gate valve assembly, the convex portion compresses against the gate to transition from a convex shape to a planar shape that conforms to a corresponding portion of the gate.

In an exemplary embodiment of the gate valve assembly, the gate valve assembly further comprises a wiper disposed on either side of the protruding portion, wherein each wipers protects the seal from damage.

In an exemplary embodiment of the gate valve assembly, the wedging element is a plurality of wedging elements longitudinally aligned along the seal.

In an exemplary embodiment of the gate valve assembly, the second wedging element is a plurality of second wedging elements longitudinally aligned along the seal opposite the plurality of wedging elements.

In an exemplary embodiment of the gate valve assembly, the gate valve assembly further comprises a fastener for driving the wedging element longitudinally.

In an exemplary embodiment of the gate valve assembly, the seal comprises an inlet seal portion abutting an inlet portion of the gate, an outlet seal portion abutting an outlet portion of the gate, and two side seal portions abutting a respective side portion of the gate, wherein the seal is one-piece and surrounds a portion of the gate.

In an exemplary embodiment of the gate valve assembly, the seal is a low drag seal comprising a main body portion defining the second seal surface and a first leg extending from the main body portion away from the second seal surface, wherein the first leg has a concave portion at an end of the first leg and opposite the second seal surface In an exemplary embodiment of the gate valve assembly, the seal has a second leg extending from the main body portion, the second leg having a concave portion at an end of the second leg and opposite the second seal surface, wherein the first leg and the second leg are disposed at opposite sides of the second seal surface.

According to another aspect of the invention, is a seal assembly comprising a seal having a longitudinal axis and a lateral axis perpendicular to the longitudinal axis, wherein the seal has a first seal surface extending along the longitudinal axis, and a wedging element abutting a second seal surface of the seal opposite the first seal surface, wherein the wedging element comprises a front side for engaging the second seal surface and a backside for engaging an opposite wedge surface such that movement of the wedging element along the longitudinal axis causes the wedging element to exert a force against the seal along a lateral axis perpendicular to the longitudinal axis.

In an exemplary embodiment of the seal assembly, the wedging element comprises a first cam component that engages with the seal, and a second cam component that engages with the first cam component, wherein one of the first cam component or the second cam component is moveable relative to the seal in a first direction along the longitudinal axis, and wherein when the one of the first or second cam moves relative to the seal in the first direction along the longitudinal axis, either the first or second cam compresses the seal in a first direction along the lateral axis.

In an exemplary embodiment of the seal assembly, the first cam component includes the front side and a cam surface opposite the front side, the first cam component engaging with the seal along the front side and engaging with the second cam component along the cam surface, and the first cam component moves relative the second cam component.

In an exemplary embodiment of the seal assembly, the second cam component includes the opposite wedge surface that engages the cam surface of the first cam component, wherein the opposite wedge surface of the second cam component and the cam surface of the first cam component are inclined opposite to each other for the second cam component to act on the first cam component to compress the seal as the first cam component moves laterally in the first direction.

In an exemplary embodiment of the seal assembly, the front side of the first cam component is planar.

In an exemplary embodiment of the seal assembly, when the first cam component moves in a second direction opposite the first direction, the cam first cam component decompresses the seal.

In an exemplary embodiment of the seal assembly, the back side of the wedging element is planar and inclined longitudinally to allow the wedging element to slide laterally as the wedging element moves longitudinally along the opposite wedge surface.

In an exemplary embodiment of the seal assembly, the front side of the wedging element is planar and parallel with the second seal surface of the seal.

In an exemplary embodiment of the seal assembly, the back side of the wedging element is planar and parallel with the opposite wedge surface.

In an exemplary embodiment of the seal assembly, the first seal surface of the seal formed by a protruding portion opposite the second seal surface abutting the wedging element.

In an exemplary embodiment of the seal assembly, the protruding portion includes a convex portion for sealing against a gate.

In an exemplary embodiment of the seal assembly, the convex portion compresses against the gate to transition from a convex shape to a planar shape that conforms to a corresponding portion of a gate.

In an exemplary embodiment of the seal assembly, the seal assembly further comprising a wiper disposed on either side of the protruding portion, wherein each wipers protects the seal from damage.

In an exemplary embodiment of the seal assembly, the wedging element is a plurality of wedging elements longitudinally aligned along the seal.

In an exemplary embodiment of the seal assembly, the wedging element comprises a plurality of longitudinally aligned first cam components that engage with the seal, and a plurality of longitudinally aligned second cam components that engage with the first cam components.

In an exemplary embodiment of the seal assembly, the seal assembly further comprising a fastener for driving a portion of the wedging element longitudinally.

In an exemplary embodiment of the seal assembly, the seal assembly is part of a gate valve, wherein the seal comprises an inlet seal portion abutting an inlet portion of a gate, an outlet seal portion abutting an outlet portion of the gate, and two side seal portions abutting a respective side portion of the gate, wherein the seal is one-piece and surrounds a portion of the gate.

In an exemplary embodiment of the seal assembly, the seal is a low drag seal comprising a main body portion defining the second seal surface and a first leg extending from the main body portion away from the second seal surface, wherein the first leg has a concave portion at an end of the first leg and opposite the second seal surface In an exemplary embodiment of the seal assembly, the seal has a second leg extending from the main body portion, the second leg having a concave portion at an end of the second leg and opposite the second seal surface, wherein the first leg and the second leg are disposed at opposite sides of the second seal surface.

In an exemplary embodiment of the seal assembly, a/the fastener is self-adjusting to provide longitudinal force against the wedging element as the wedging element moves longitudinally relative to the fastener.

In an exemplary embodiment of the seal assembly, a/the fastener includes a resilient member to exert longitudinal force against the wedging element to exert lateral force against the seal as the wedging element moves longitudinally relative to the fastener.

In an exemplary embodiment of the seal assembly, a/the fastener includes a body that defines a central passage and includes a piston that is moveable within the central passage, wherein a/the resilient member is compressible within the central passage as the body moves longitudinally relative to the piston.

In an exemplary embodiment of the seal assembly, when the resilient member is at least partially compressed, the resilient member exerts a longitudinal force against the body and the piston to move the piston longitudinally relative to the body.

In an exemplary embodiment of the seal assembly, a/the resilient member provides a longitudinal force to the wedging element to longitudinally move the wedging element, thereby causing the wedging element to exert a force along the lateral axis.

In an exemplary embodiment of the seal assembly, the resilient member provides a longitudinal force to the wedging element longitudinally move a/the piston against the wedging element to longitudinally move the wedging element, thereby causing the wedging element to exert a force along the lateral axis.

In an exemplary embodiment of the seal assembly, the resilient member is a spring.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A gate valve assembly comprising:
a valve body having an inlet and an outlet;
a gate disposed within the valve body and slidably connected to the valve body such that the gate slides along a normal axis between an open position to a closed position, wherein in the closed position the inlet is fluidly disconnected from the outlet;
a seal having a longitudinal axis perpendicular to the normal axis and extending along the gate such that the gate slides against a first seal surface of the seal when the gate slides between the open position and the closed position; and
a wedging element abutting a second seal surface of the seal opposite the first seal surface;
wherein the wedging element comprises a front side for engaging the second seal surface and a backside for engaging an opposite wedge surface such that movement of the wedging element along the longitudinal axis causes the wedging element to exert a force against the seal in a first lateral direction along a lateral axis perpendicular to the longitudinal axis;
wherein the second seal surface of the seal faces laterally in a second lateral direction, opposite the first lateral direction, and the lateral axis from the second seal surface in the second lateral direction does not intersect any other part of the seal; and
wherein the seal further comprises:
a first leg portion that extends longitudinally and in the second lateral direction away from the second seal surface, wherein the first leg portion engages the valve body to seal against the valve body, and whereby the first leg portion extends past at least part of the wedging element in the second lateral direction.

2. The gate valve assembly of claim 1, wherein the front side of the wedging element is planar and parallel with the second seal surface of the seal, or the back side of the wedging element is planar and parallel with the opposite wedge surface.

3. The gate valve assembly of claim 1, wherein the wedging element is a plurality of wedging elements longitudinally aligned along the seal.

4. The gate valve assembly of claim 1, wherein the seal comprises:
an inlet seal portion abutting an inlet portion of the gate;
an outlet seal portion abutting an outlet portion of the gate; and
two side seal portions abutting a respective side portion of the gate,
wherein the seal is one-piece and surrounds a portion of the gate.

5. The gate valve of claim 1, wherein the back side of the wedging element is planar and inclined longitudinally to allow the wedging element to slide laterally as the wedging element moves longitudinally along the opposite wedge surface.

6. The gate valve assembly of claim 1, further comprising:
a second wedging element forming the opposite wedge surface, wherein the second wedging element is disposed between the valve body and the back side of the wedging element.

7. The gate valve assembly of claim 6, wherein the back side of the wedging element is planar and inclined longitudinally to allow the wedging element to slide laterally as the wedging element moves longitudinally along the second wedging element.

8. The gate valve assembly of claim 1, further comprising:
a fastener for driving the wedging element longitudinally.

9. The gate valve gate of claim 8, wherein the fastener is self-adjusting to provide longitudinal force against the wedging element as the wedging element moves longitudinally relative to the fastener.

10. The gate valve of claim 1, wherein the wedging element comprises:
a first cam component that engages with the seal; and
a second cam component that engages with the first cam component, wherein one of the first cam component or the second cam component is moveable relative to the seal in a first longitudinal direction along the longitudinal axis, and
wherein when the one of the first or second cam moves relative to the seal in the first longitudinal direction along the longitudinal axis, either the first or second cam compresses the seal in the first lateral direction along the lateral axis.

11. The gate valve of claim 10, wherein the first cam component includes the front side and a cam surface opposite the front side, the first cam component engaging with the seal along the front side and engaging with the second cam component along the cam surface, and the first cam component moves relative the second cam component.

12. The gate valve of claim 1, wherein the seal is a low drag seal comprising a main body portion defining the second seal surface and first leg portion extending from the main body portion away from the second seal surface, wherein the first leg portion has a concave portion, facing in the second lateral direction, at an end of the first leg portion and opposite the second seal surface.

13. The gate valve of claim 12, wherein the seal has a second leg portion extending from the main body portion, the second leg portion having a concave portion, facing in the second lateral direction, at an end of the second leg portion and opposite the second seal surface.

14. A seal assembly comprising:
a seal having a longitudinal axis, a normal axis that is perpendicular to the longitudinal axis, and a lateral axis that is perpendicular to both the longitudinal axis and the normal axis, wherein the seal has a first seal surface extending along the longitudinal axis and facing in a first lateral direction along the lateral axis; and
a wedging element abutting a second seal surface of the seal opposite the first seal surface, whereby the second seal surface faces in a second lateral direction that is opposite the first lateral direction;
wherein the seal further comprises:
a first leg portion that extends longitudinally and in the second lateral direction away from the second seal surface along the lateral axis; and
a second leg portion that extends longitudinally and in the second lateral direction away from the second seal surface along the lateral axis, wherein the second leg portion is offset from the first leg portion along the normal axis such that the second seal surface is disposed between the first leg portion and the second leg portion;
wherein the wedging element comprises a front side for engaging the second seal surface and a backside for engaging an opposite wedge surface such that movement of the wedging element along the longitudinal axis causes the wedging element to exert a force against the seal in the first lateral direction along the lateral axis perpendicular to the longitudinal axis, whereby the wedging element is disposed between the first leg portion and the second leg portion; and
wherein the second seal surface of the seal faces laterally in the second lateral direction, opposite the first lateral direction, and the lateral axis from the second seal surface in the second lateral direction does not intersect any other part of the seal.

15. The seal assembly of claim 14, wherein the first seal surface extends straight along the longitudinal axis parallel with the first leg portion and the second leg portion, thereby allowing the first seal surface to seal against a planar gate surface.

16. The seal assembly of claim 14, further including a third seal surface that faces laterally toward the first seal surface and that is laterally spaced from the first seal surface to allow a gate to move therebetween along the normal axis.

17. The seal assembly of claim 14, wherein the seal further comprises:
an inlet seal portion that forms the first seal surface;
an outlet seal portion that forms a third seal surface that faces laterally toward the first seal surface; and
two side seal portions longitudinally spaced from one another,
wherein the seal is one-piece for surrounding a portion of a gate.

18. The seal assembly of claim 14, wherein the first seal surface of the seal is formed by a protruding portion opposite the second seal surface abutting the wedging element.

19. The seal assembly of claim 18, wherein the protruding portion includes a convex portion for sealing against a gate when the seal is in an uncompressed state, and wherein when the seal is in a compressed state the convex portion compresses against the gate to transition from a convex shape to a planar shape that conforms to a corresponding portion of a gate.

20. The seal assembly of claim 18, further comprising:
a wiper disposed on either side of the protruding portion, wherein each wiper protects the seal from damage.

* * * * *